(12) United States Patent
Mahamood

(10) Patent No.: US 10,664,558 B2
(45) Date of Patent: May 26, 2020

(54) METHOD AND APPARATUS FOR DOCUMENT PLANNING

(71) Applicant: Arria Data2Text Limited, Aberdeen (GB)

(72) Inventor: Saad Mahamood, Aberdeen (GB)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 0 days.

(21) Appl. No.: 15/022,420

(22) PCT Filed: Apr. 18, 2014

(86) PCT No.: PCT/IB2014/060846
§ 371 (c)(1),
(2) Date: Mar. 16, 2016

(87) PCT Pub. No.: WO2015/159133
PCT Pub. Date: Oct. 22, 2015

(65) Prior Publication Data
US 2016/0232152 A1 Aug. 11, 2016

(51) Int. Cl.
*G06F 17/24* (2006.01)
*G06F 17/22* (2006.01)
*G06F 17/28* (2006.01)

(52) U.S. Cl.
CPC ........ *G06F 17/248* (2013.01); *G06F 17/2247* (2013.01); *G06F 17/2881* (2013.01)

(58) Field of Classification Search
None
See application file for complete search history.

(56) References Cited

U.S. PATENT DOCUMENTS 5,181,250 A   1/1993  Morgan et al.
5,237,502 A   8/1993  White et al.
(Continued)

FOREIGN PATENT DOCUMENTS

AU   2011247830 B2   12/2011
AU   2011253627 B2   12/2011
(Continued)

OTHER PUBLICATIONS

U.S. Appl. No. 13/186,346, filed Jul. 19, 2011; In re: Nicholas et al., entitles *Method and Apparatus for Triggering the Automatic Generation of Narratives*.
(Continued)

*Primary Examiner* — Howard Cortes
(74) *Attorney, Agent, or Firm* — Alston & Bird LLP

(57) ABSTRACT

Methods, apparatuses, and computer program products are described herein that are configured to be embodied as and/or performed by a document planner. In some examples, a method is provided for generating a document plan. The method may include receiving a document plan template and a message store. The document plan template may include program code defining the structure and content of a document plan. The method may also include processing, by a processor, the document plan template to determine one or more messages from the message store for inclusion in the document plan. The method may also include generating the document plan. A structure and a content of the document plan may be determined at least based on the determined one or more messages and the document plan template. Apparatuses and computer readable media are also provided.

20 Claims, 5 Drawing Sheets

(56) References Cited

U.S. PATENT DOCUMENTS

| | | |
|---|---|---|
| 5,311,429 A | 5/1994 | Tominaga |
| 5,321,608 A | 6/1994 | Namba et al. |
| 5,629,687 A | 5/1997 | Sutton et al. |
| 5,794,177 A | 8/1998 | Carus et al. |
| 5,802,488 A | 9/1998 | Edatsune |
| 6,023,669 A | 2/2000 | Suda et al. |
| 6,078,914 A | 6/2000 | Redfern |
| 6,138,087 A | 10/2000 | Budzinski |
| 6,266,617 B1 | 7/2001 | Evans |
| 6,442,485 B2 | 8/2002 | Evans |
| 6,466,899 B1 | 10/2002 | Yano et al. |
| 6,629,340 B1 | 10/2003 | Dale et al. |
| 6,665,640 B1 | 12/2003 | Bennett et al. |
| 6,717,513 B1 | 4/2004 | Sandelman et al. |
| 6,947,885 B2 | 9/2005 | Bangalore et al. |
| 7,043,420 B2 | 5/2006 | Ratnaparkhi |
| 7,062,483 B2 | 6/2006 | Ferrari et al. |
| 7,167,824 B2 | 1/2007 | Kallulli |
| 7,231,341 B2 | 6/2007 | Bangalore et al. |
| 7,238,313 B2 | 7/2007 | Ferencz et al. |
| 7,305,336 B2 | 12/2007 | Polanyi et al. |
| 7,310,969 B2 | 12/2007 | Dale |
| 7,346,493 B2 | 3/2008 | Ringger et al. |
| 7,418,447 B2 | 8/2008 | Caldwell et al. |
| 7,424,363 B2 | 9/2008 | Cheng et al. |
| 7,444,287 B2 | 10/2008 | Claudatos et al. |
| 7,493,253 B1 | 2/2009 | Ceusters |
| 7,496,621 B2 | 2/2009 | Pan et al. |
| 7,526,424 B2 | 4/2009 | Corston-Oliver et al. |
| 7,533,089 B2 | 5/2009 | Pan et al. |
| 7,562,005 B1 | 7/2009 | Bangalore et al. |
| 7,653,545 B1 | 1/2010 | Starkie |
| 7,657,424 B2 | 2/2010 | Bennett |
| 7,684,991 B2 | 3/2010 | Stohr et al. |
| 7,711,581 B2 | 5/2010 | Hood et al. |
| 7,783,486 B2 | 8/2010 | Rosser et al. |
| 7,809,552 B2 | 10/2010 | Pan et al. |
| 7,849,048 B2 | 12/2010 | Langseth et al. |
| 7,849,049 B2 | 12/2010 | Langseth et al. |
| 7,856,390 B2 | 12/2010 | Schiller |
| 7,873,509 B1 | 1/2011 | Budzinski |
| 7,921,091 B2 | 4/2011 | Cox et al. |
| 7,930,169 B2 | 4/2011 | Billerey-Mosier |
| 7,933,774 B1 | 4/2011 | Begeja et al. |
| 7,966,172 B2 | 6/2011 | Ruiz et al. |
| 7,966,369 B1 | 6/2011 | Briere et al. |
| 7,970,601 B2 | 6/2011 | Burmester et al. |
| 7,979,267 B2 | 7/2011 | Ruiz et al. |
| 8,015,006 B2 | 9/2011 | Kennewick et al. |
| 8,019,610 B2 | 9/2011 | Walker et al. |
| 8,024,331 B2 | 9/2011 | Calistri-Yeh et al. |
| 8,037,000 B2 | 10/2011 | Delmonico et al. |
| 8,082,144 B1 | 12/2011 | Brown et al. |
| 8,090,727 B2 | 1/2012 | Lachtarnik et al. |
| 8,117,261 B2 | 2/2012 | Briere et al. |
| 8,150,676 B1 | 4/2012 | Kaeser |
| 8,175,873 B2 | 5/2012 | Di Fabbrizio et al. |
| 8,180,647 B2 | 5/2012 | Walker et al. |
| 8,180,758 B1 | 5/2012 | Cornali |
| 8,204,751 B1 | 6/2012 | Di Fabbrizio et al. |
| 8,229,937 B2 | 7/2012 | Kiefer et al. |
| 8,355,903 B1 | 1/2013 | Birnbaum et al. |
| 8,374,848 B1 | 2/2013 | Birnbaum et al. |
| 8,425,325 B2 | 4/2013 | Hope |
| 8,457,950 B1 | 6/2013 | Gardner |
| 8,473,911 B1 | 6/2013 | Baxter |
| 8,494,944 B2 | 7/2013 | Schiller |
| 8,515,733 B2 | 8/2013 | Jansen |
| 8,515,737 B2 | 8/2013 | Allen |
| 8,521,512 B2 | 8/2013 | Gorman et al. |
| 8,548,814 B2 | 10/2013 | Manuel-Devadoss |
| 8,548,915 B2 | 10/2013 | Antebi et al. |
| 8,561,014 B2 | 10/2013 | Mengusoglu et al. |
| 8,566,090 B2 | 10/2013 | Di Fabbrizio et al. |
| 8,572,173 B2 | 10/2013 | Briere et al. |
| 8,589,148 B2 | 11/2013 | Atallah et al. |
| 8,589,172 B2 | 11/2013 | Alonso et al. |
| 8,616,896 B2 | 12/2013 | Lennox |
| 8,620,669 B2 | 12/2013 | Walker et al. |
| 8,626,613 B2 | 1/2014 | Dale et al. |
| 8,630,844 B1 | 1/2014 | Nichols et al. |
| 8,655,889 B2 | 2/2014 | Hua et al. |
| 8,660,545 B1 | 2/2014 | Redford et al. |
| 8,676,691 B2 | 3/2014 | Schiller |
| 8,688,434 B1 | 4/2014 | Birnbaum et al. |
| 8,689,176 B2 | 4/2014 | Bagheri et al. |
| 8,700,396 B1 | 4/2014 | Mengibar et al. |
| 8,711,732 B2 | 4/2014 | Johnson |
| 8,719,696 B2 | 5/2014 | Duncan et al. |
| 8,738,384 B1 | 5/2014 | Bansal et al. |
| 8,738,558 B2 | 5/2014 | Antebi et al. |
| 8,762,134 B2 | 5/2014 | Reiter |
| 8,762,133 B2 | 6/2014 | Reiter |
| 8,775,161 B1 | 7/2014 | Nichols et al. |
| 8,825,533 B2 | 9/2014 | Basson et al. |
| 8,843,363 B2 | 9/2014 | Birnbaum et al. |
| 8,849,670 B2 | 9/2014 | Di Cristo et al. |
| 8,886,520 B1 | 11/2014 | Nichols et al. |
| 8,892,417 B1 | 11/2014 | Nichols et al. |
| 8,892,419 B2 | 11/2014 | Lundberg et al. |
| 8,898,063 B1 | 11/2014 | Sykes et al. |
| 8,903,711 B2 | 12/2014 | Lundberg et al. |
| 8,903,718 B2 | 12/2014 | Akuwudike |
| 8,909,595 B2 | 12/2014 | Gandy et al. |
| 8,914,452 B2 | 12/2014 | Boston et al. |
| 8,924,330 B2 | 12/2014 | Antebi et al. |
| 8,930,178 B2 | 1/2015 | Pestian et al. |
| 8,930,305 B2 | 1/2015 | Namburu et al. |
| 8,935,769 B2 | 1/2015 | Hessler |
| 8,977,953 B1 | 3/2015 | Pierre et al. |
| 8,984,051 B2 | 3/2015 | Olsen et al. |
| 9,002,695 B2 | 4/2015 | Watanabe et al. |
| 9,002,869 B2 | 4/2015 | Riezler et al. |
| 9,015,730 B1 | 4/2015 | Allen et al. |
| 9,028,260 B2 | 5/2015 | Nanjiani et al. |
| 9,092,276 B2 | 7/2015 | Allen et al. |
| 9,104,720 B2 | 8/2015 | Rakshit et al. |
| 9,110,882 B2 | 8/2015 | Overell et al. |
| 9,110,977 B1 | 8/2015 | Pierre et al. |
| 9,111,534 B1 | 8/2015 | Sylvester et al. |
| 9,135,244 B2 | 9/2015 | Reiter |
| 9,135,662 B2 | 9/2015 | Evenhouse et al. |
| 9,146,904 B2 | 9/2015 | Allen |
| 9,164,982 B1 | 10/2015 | Kaeser |
| 9,173,005 B1 | 10/2015 | Redford et al. |
| 9,190,054 B1 | 11/2015 | Riley et al. |
| 9,208,147 B1 | 12/2015 | Nichols et al. |
| 9,229,927 B2 | 1/2016 | Wolfram et al. |
| 9,240,197 B2 | 1/2016 | Begeja et al. |
| 9,244,894 B1 | 1/2016 | Dale et al. |
| 9,251,134 B2 | 2/2016 | Birnbaum et al. |
| 9,251,143 B2 | 2/2016 | Bird et al. |
| 9,263,039 B2 | 2/2016 | Di Cristo et al. |
| 9,268,770 B1 | 2/2016 | Kursun |
| 9,323,743 B2 | 4/2016 | Reiter |
| 9,396,181 B1 | 7/2016 | Sripada et al. |
| 9,405,448 B2 | 8/2016 | Reiter |
| 9,640,045 B2 | 5/2017 | Reiter |
| 9,904,676 B2 | 2/2018 | Sripada et al. |
| 10,026,274 B2 | 7/2018 | Reiter |
| 2002/0026306 A1 | 2/2002 | Bangalore et al. |
| 2002/0143742 A1 | 10/2002 | Nonomura et al. |
| 2003/0131315 A1 | 7/2003 | Escher |
| 2003/0182102 A1 | 9/2003 | Corston-Oliver et al. |
| 2003/0195740 A1* | 10/2003 | Tokuda .............. G10L 15/26 704/1 |
| 2003/0212545 A1 | 11/2003 | Kallulli |
| 2004/0044515 A1 | 3/2004 | Metcalf et al. |
| 2004/0246120 A1 | 12/2004 | Benner et al. |
| 2005/0039107 A1 | 2/2005 | Hander et al. |
| 2005/0108001 A1 | 5/2005 | Aarskog |
| 2005/0228635 A1 | 10/2005 | Araki et al. |
| 2005/0256703 A1 | 11/2005 | Markel |

(56) References Cited

U.S. PATENT DOCUMENTS

| | | |
|---|---|---|
| 2006/0020886 A1* | 1/2006 | Agrawal ............... G06F 17/248 |
| | | 715/256 |
| 2006/0020916 A1 | 1/2006 | Allison et al. |
| 2006/0085414 A1 | 4/2006 | Chai et al. |
| 2006/0085667 A1 | 4/2006 | Kubota et al. |
| 2006/0136196 A1 | 6/2006 | Brun et al. |
| 2006/0178868 A1* | 8/2006 | Billerey-Mosier ........................ |
| | | G06F 17/2881 |
| | | 704/9 |
| 2006/0184888 A1 | 8/2006 | Bala |
| 2006/0224638 A1 | 10/2006 | Wald et al. |
| 2006/0242563 A1 | 10/2006 | Liu et al. |
| 2006/0259293 A1 | 11/2006 | Orwant |
| 2007/0038643 A1 | 2/2007 | Epstein |
| 2007/0078655 A1 | 4/2007 | Semkow et al. |
| 2007/0106628 A1 | 5/2007 | Adjali et al. |
| 2007/0129942 A1 | 6/2007 | Ban et al. |
| 2007/0143099 A1 | 6/2007 | Balchandran et al. |
| 2007/0150806 A1* | 6/2007 | Hartmann ............ G06F 17/2247 |
| | | 715/235 |
| 2007/0156677 A1 | 7/2007 | Szabo |
| 2007/0169021 A1* | 7/2007 | Huynh ................ G06F 19/3487 |
| | | 717/136 |
| 2007/0219773 A1 | 9/2007 | Roux et al. |
| 2008/0221865 A1 | 9/2008 | Wellmann |
| 2008/0221870 A1 | 9/2008 | Attardi et al. |
| 2008/0281781 A1 | 11/2008 | Zhao et al. |
| 2008/0312954 A1 | 12/2008 | Ullrich et al. |
| 2009/0076799 A1 | 3/2009 | Crouch et al. |
| 2009/0089100 A1 | 4/2009 | Nenov et al. |
| 2009/0089126 A1 | 4/2009 | Odubiyi |
| 2009/0111486 A1 | 4/2009 | Burstrom |
| 2009/0138258 A1 | 5/2009 | Neale |
| 2009/0144609 A1 | 6/2009 | Liang et al. |
| 2009/0156229 A1 | 6/2009 | Hein et al. |
| 2009/0177929 A1 | 7/2009 | Sijelmassi |
| 2009/0182549 A1 | 7/2009 | Anisimovich et al. |
| 2009/0198496 A1 | 8/2009 | Denecke |
| 2009/0281839 A1 | 11/2009 | Lynn et al. |
| 2009/0286514 A1 | 11/2009 | Lichorowic et al. |
| 2009/0287567 A1 | 11/2009 | Penberthy et al. |
| 2010/0146491 A1 | 6/2010 | Hirano et al. |
| 2010/0153095 A1 | 6/2010 | Yang et al. |
| 2010/0153105 A1 | 6/2010 | Di Fabbrizio et al. |
| 2010/0174545 A1 | 7/2010 | Otani |
| 2010/0191658 A1 | 7/2010 | Kannan et al. |
| 2010/0203970 A1 | 8/2010 | Hope |
| 2010/0210379 A1 | 8/2010 | Shelley |
| 2010/0241421 A1 | 9/2010 | Funakoshi |
| 2010/0325608 A1 | 12/2010 | Radigan |
| 2010/0332235 A1 | 12/2010 | David |
| 2011/0010164 A1 | 1/2011 | Williams |
| 2011/0035210 A1 | 2/2011 | Rosenfeld et al. |
| 2011/0055687 A1 | 3/2011 | Bhandar et al. |
| 2011/0068929 A1 | 3/2011 | Franz et al. |
| 2011/0087486 A1 | 4/2011 | Schiller |
| 2011/0160986 A1 | 6/2011 | Wu et al. |
| 2011/0179006 A1 | 7/2011 | Cox et al. |
| 2011/0184959 A1 | 7/2011 | Maxwell, III et al. |
| 2011/0218822 A1 | 9/2011 | Buisman et al. |
| 2011/0225185 A1 | 9/2011 | Gupta |
| 2011/0257839 A1 | 10/2011 | Mukherjee |
| 2011/0307435 A1 | 12/2011 | Overell et al. |
| 2011/0313757 A1 | 12/2011 | Hoover et al. |
| 2011/0314060 A1* | 12/2011 | Sinha ................ G06F 17/30929 |
| | | 707/779 |
| 2012/0078888 A1 | 3/2012 | Brown et al. |
| 2012/0084027 A1 | 4/2012 | Caine |
| 2012/0131008 A1 | 5/2012 | Ahn et al. |
| 2012/0136649 A1 | 5/2012 | Freising et al. |
| 2012/0158089 A1 | 6/2012 | Bocek et al. |
| 2012/0173475 A1 | 7/2012 | Ash et al. |
| 2012/0232919 A1 | 9/2012 | Wilson et al. |
| 2012/0290289 A1 | 11/2012 | Manera et al. |
| 2012/0290310 A1 | 11/2012 | Watson |
| 2012/0310990 A1 | 12/2012 | Viegas et al. |
| 2013/0013290 A1 | 1/2013 | Funakoshi et al. |
| 2013/0030810 A1 | 1/2013 | Kopparapu et al. |
| 2013/0041921 A1 | 2/2013 | Cooper et al. |
| 2013/0066873 A1 | 3/2013 | Salvetti et al. |
| 2013/0095864 A1 | 4/2013 | Marovets |
| 2013/0138428 A1 | 5/2013 | Chandramouli et al. |
| 2013/0144606 A1 | 6/2013 | Birnbaum et al. |
| 2013/0145242 A1 | 6/2013 | Birnbaum et al. |
| 2013/0151238 A1 | 6/2013 | Beaurpere et al. |
| 2013/0174026 A1 | 7/2013 | Locke |
| 2013/0185050 A1 | 7/2013 | Bird et al. |
| 2013/0185056 A1 | 7/2013 | Ingram et al. |
| 2013/0205195 A1 | 8/2013 | Dekhil et al. |
| 2013/0211855 A1 | 8/2013 | Eberle et al. |
| 2013/0238329 A1 | 9/2013 | Casella dos Santos |
| 2013/0238330 A1 | 9/2013 | Casella dos Santos |
| 2013/0238987 A1 | 9/2013 | Lutwyche |
| 2013/0251233 A1 | 9/2013 | Yang et al. |
| 2013/0268263 A1 | 10/2013 | Park et al. |
| 2013/0293363 A1 | 11/2013 | Plymouth et al. |
| 2013/0311201 A1 | 11/2013 | Chatfield et al. |
| 2014/0019531 A1 | 1/2014 | Czajka et al. |
| 2014/0025371 A1 | 1/2014 | Min |
| 2014/0039878 A1 | 2/2014 | Wasson |
| 2014/0052696 A1 | 2/2014 | Soroushian |
| 2014/0062712 A1 | 3/2014 | Reiter |
| 2014/0067377 A1 | 3/2014 | Reiter |
| 2014/0072947 A1 | 3/2014 | Boguraev et al. |
| 2014/0072948 A1 | 3/2014 | Boguraev et al. |
| 2014/0089212 A1 | 3/2014 | Sbodio |
| 2014/0100846 A1 | 4/2014 | Haine et al. |
| 2014/0100901 A1 | 4/2014 | Haine et al. |
| 2014/0100923 A1 | 4/2014 | Strezo et al. |
| 2014/0143720 A1 | 5/2014 | Dimarco et al. |
| 2014/0149107 A1 | 5/2014 | Schilder |
| 2014/0164303 A1 | 6/2014 | Bagchi et al. |
| 2014/0164304 A1 | 6/2014 | Bagchi et al. |
| 2014/0188477 A1 | 7/2014 | Zhang |
| 2014/0278358 A1 | 9/2014 | Byron et al. |
| 2014/0281935 A1 | 9/2014 | Byron et al. |
| 2014/0281951 A1 | 9/2014 | Megiddo et al. |
| 2014/0297268 A1 | 10/2014 | Govrin et al. |
| 2014/0316768 A1 | 10/2014 | Khandekar |
| 2014/0328570 A1* | 11/2014 | Cheng .................. G11B 27/10 |
| | | 386/241 |
| 2014/0358964 A1 | 12/2014 | Woods et al. |
| 2014/0365518 A1* | 12/2014 | Calo .................. G06F 16/243 |
| | | 707/760 |
| 2014/0375466 A1 | 12/2014 | Reiter |
| 2014/0379322 A1 | 12/2014 | Koutrika et al. |
| 2014/0379378 A1 | 12/2014 | Cohen-Solal et al. |
| 2015/0006437 A1 | 1/2015 | Byron et al. |
| 2015/0032443 A1 | 1/2015 | Karov et al. |
| 2015/0081299 A1 | 3/2015 | Jasinschi et al. |
| 2015/0081307 A1 | 3/2015 | Cederstrom et al. |
| 2015/0081321 A1 | 3/2015 | Jain |
| 2015/0095015 A1 | 4/2015 | Lani et al. |
| 2015/0106307 A1 | 4/2015 | Antebi et al. |
| 2015/0142418 A1 | 5/2015 | Byron et al. |
| 2015/0142421 A1 | 5/2015 | Buurman et al. |
| 2015/0154359 A1 | 6/2015 | Harris et al. |
| 2015/0163358 A1 | 6/2015 | Klemm et al. |
| 2015/0169522 A1 | 6/2015 | Logan et al. |
| 2015/0169548 A1 | 6/2015 | Reiter |
| 2015/0169659 A1 | 6/2015 | Lee et al. |
| 2015/0169720 A1 | 6/2015 | Byron et al. |
| 2015/0169737 A1 | 6/2015 | Bryon et al. |
| 2015/0179082 A1 | 6/2015 | Byron et al. |
| 2015/0205858 A1* | 7/2015 | Xie ...................... G06Q 50/01 |
| | | 707/755 |
| 2015/0227508 A1* | 8/2015 | Howald ............. G06F 17/2881 |
| | | 704/9 |
| 2015/0242384 A1 | 8/2015 | Reiter |
| 2015/0261744 A1 | 9/2015 | Suenbuel et al. |
| 2015/0261836 A1 | 9/2015 | Madhani et al. |
| 2015/0279348 A1 | 10/2015 | Cao et al. |
| 2015/0310013 A1 | 10/2015 | Allen et al. |

(56) References Cited

U.S. PATENT DOCUMENTS

| | | |
|---|---|---|
| 2015/0310112 A1 | 10/2015 | Allen et al. |
| 2015/0310861 A1 | 10/2015 | Waltermann et al. |
| 2015/0324343 A1 | 11/2015 | Carter et al. |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0324413 A1 | 11/2015 | Gubin et al. |
| 2015/0325000 A1 | 11/2015 | Sripada |
| 2015/0326622 A1 | 11/2015 | Carter et al. |
| 2015/0331845 A1 | 11/2015 | Guggilla et al. |
| 2015/0331846 A1 | 11/2015 | Guggilla et al. |
| 2015/0332670 A1 | 11/2015 | Akbacak et al. |
| 2015/0347400 A1 | 12/2015 | Sripada |
| 2015/0356127 A1 | 12/2015 | Pierre et al. |
| 2015/0363363 A1 | 12/2015 | Bohra et al. |
| 2015/0363364 A1 | 12/2015 | Sripada |
| 2015/0363382 A1 | 12/2015 | Bohra et al. |
| 2015/0363390 A1 | 12/2015 | Mungi et al. |
| 2015/0363391 A1 | 12/2015 | Mungi et al. |
| 2015/0371651 A1 | 12/2015 | Aharoni et al. |
| 2016/0019200 A1 | 1/2016 | Allen |
| 2016/0027125 A1 | 1/2016 | Bryce |
| 2016/0055150 A1 | 2/2016 | Bird et al. |
| 2016/0132489 A1 | 5/2016 | Reiter |
| 2016/0140090 A1 | 5/2016 | Dale et al. |
| 2016/0328381 A1 | 11/2016 | Reiter |
| 2016/0328385 A1 | 11/2016 | Reiter |
| 2017/0018107 A1 | 1/2017 | Reiter |
| 2017/0075884 A1 | 3/2017 | Sripada et al. |

FOREIGN PATENT DOCUMENTS

| | | |
|---|---|---|
| AU | 2013201755 A1 | 9/2013 |
| AU | 2013338351 A1 | 5/2015 |
| CA | 2577721 C | 3/2006 |
| CA | 2826116 C | 3/2006 |
| CN | 103999081 A | 8/2014 |
| CN | 104182059 A | 12/2014 |
| CN | 104881320 A | 9/2015 |
| EP | 1336955 B1 | 8/2003 |
| EP | 2707809 A1 | 3/2014 |
| EP | 2750759 A1 | 7/2014 |
| EP | 2849103 A2 | 3/2015 |
| GB | 2518192 A | 3/2015 |
| JP | S61221873 A | 10/1986 |
| JP | 2004021791 A | 1/2004 |
| JP | 2014165766 A | 9/2014 |
| WO | WO 2000/074394 A2 | 12/2000 |
| WO | WO 2002/031628 A2 | 4/2002 |
| WO | WO 2002/031628 A3 | 4/2002 |
| WO | WO 2002/073449 A1 | 9/2002 |
| WO | WO 2002/073531 AI | 9/2002 |
| WO | WO 2006/010044 A2 | 1/2006 |
| WO | WO 2007/041221 A1 | 4/2007 |
| WO | WO 2009/014465 A2 | 1/2009 |
| WO | WO 2010/049925 A2 | 5/2010 |
| WO | WO 2010/051404 A1 | 5/2010 |
| WO | WO 2012/071571 A2 | 5/2012 |
| WO | WO 2013/009613 A1 | 1/2013 |
| WO | WO 2013/042115 A2 | 3/2013 |
| WO | WO 2013/042116 A1 | 3/2013 |
| WO | WO 2013/177280 A1 | 11/2013 |
| WO | WO 2014/035402 A1 | 3/2014 |
| WO | WO 2014/098560 A2 | 6/2014 |
| WO | WO 2014/140977 A1 | 9/2014 |
| WO | WO 2014/187076 A1 | 11/2014 |
| WO | WO 2015/028844 A1 | 3/2015 |
| WO | WO 2015/113301 A1 | 8/2015 |
| WO | WO 2015/148278 A1 | 10/2015 |
| WO | WO 2015/159133 A1 | 10/2015 |
| WO | WO 2015/164253 A1 | 10/2015 |
| WO | WO 2015/175338 A1 | 11/2015 |
| WO | WO 2016/004266 A2 | 1/2016 |

OTHER PUBLICATIONS

U.S. Appl. No. 14/027,684, filed Sep. 16, 2013; In re: Sripada et al., entitled *Method, Apparatus, and Computer Program Product for User-Directed Reporting*.

U.S. Appl. No. 14/914,461, filed Feb. 25, 2016; In re: Reiter et al., entitled *Text Generation From Correlated Alerts*.

U.S. Appl. No. 15/074,425, filed Mar. 18, 2016; In re: Reiter, entitled *Method and Apparatus for Situational Analysis Text Generation*.

U.S. Appl. No. 15/093,337, filed Apr. 7, 2016; In re: Reiter, entitled *Method and Apparatus for Referring Expression Generation*.

U.S. Appl. No. 15/093,365, filed Apr. 7, 2016; In re: Logan et al., entitled *Method and Apparatus for Updating a Previously Generated Text*.

International Search Report and Written Opinion from corresponding International Patent Application No. PCT/IB2014/060846 dated Feb. 4, 2015.

Reiter, E., et al.; "Studies in Natural Language Processing—Building Natural Language Generation Systems;" Cambridge University Press; dated 2000.

Reiter, E; "An Architecture for Data-to-Text Systems"; Proceedings of ENGL-2007; Jun. 20, 2007; pp. 97-104; XP055071296; Retrieved from the Internet: URL: http://homepages.abdn.ac.uk/e.reiter/pages/papers/enlg07.pdf.

Reiter, E; "Chapter 4: Document Planning (early draft)"; Building Natural Language Generation Systems; 2005; pp. 73-113; XP055165098; Retrieved from the Internet: URL: http://www.ling.helsinki.fi/~gwilcock/Tartu-2003/ReiterDale/4-DocumentPlanning.pdf.

Seki, Yohei; "XML Transformation-Based Three-Stage Pipelined Natural Language Generation System"; Proc. of 6th NLP Pacific Rim Symposium (NLPRS 2001); 2001; pp. 767-768; XP055165118; Retrieved from the Internet: URL: http://www.afnlp.org/archives/nlprs2001/pdf/exh-04-01.pdf?origin=publication_detail.

Wilcock, Graham; "An Overview of Shallow XML-Based Natural Language Generation"; Baltic HLT 2005; 2005; pp. 67-78; XP055165064; Tallinn, Estonia.

Alwawneh, A. L. et al., *Pattern Recognition Techniques Applied to the Abstraction of Traces of Inter-Process Communication*, Software Maintenance and Reengineering (CSMR), 2011 15th European Conference on Year: 2011, IEEE Conference Publications (2011) pp. 211-220.

Andre, E. et al., *From Visual Data to Multimedia Presentations*, Grounding Representations: Integration of Sensory Information in Natural Language Processing, Artificial Intelligence and Neural networks, IEE Colloquium on (May 15, 1995) pp. 1-3.

Andre, E. et al., *Natural Language Access to Visual Data: Dealing with Space and Movement*, Report 63, German Research Center for Artificial Intelligence (DFKI) SFB 314, Project VITRA, (Nov. 1989) 1-21.

Barzilay, R., et al.; "*Aggregation via Set Partitioning for Natural Language Generation;*" Proceedings of the Human Language Technology Conference of the North American Chapter of the ACL; pp. 359-366; dated Jun. 2006.

Bhoedjang, R. A. F. et al., *Optimizing Distrubuted Data Structures Using Application-Specific Network Interface Software*, Parallel Processing, 1998, Proceedings; 1998 International Conference on Year: 1998, IEEE Conference Publications (1998) pp. 485-492.

Cappozzo, A. et al., *Surface-Marker Cluster Design Criteria for 3-D Bone Movement Reconstruction*, IEEE Transactions on Biomedical Engineering, vol. 44, No. 12 (Dec. 1997) 1165-1174.

Chang-Jie, M. et al., *Interactive Location-based Services Combined with Natural Language*, International Conference on Wireless Communications, Networking and Mobile Computing (2007) 3015-3018.

Dalianis, H. et al.; "*Aggregation in Natural Language Generation;*" Trends in Natural Language Generation, an Artificial Intelligence Perspective; pp. 88-105; dated 1996.

Dragon, R. et al., *Multi-Scale Clustering of Frame to Frame Correspondences for Motion Segmentation*, Computer Vision ECCV 2012, Springer Berlin Heidelberg (Oct. 7, 2012) 445-458.

(56) References Cited

OTHER PUBLICATIONS

Gatt, A. et al., *From Data to Text in the Neonatal Intensive Care Unit: Using NLG Technology for Decision Support and Information Management*, Al Communication (Jan. 1, 2009) 153-186.
Gorelov, S. s. et al., *Search Optimization in Semistructured Databases Using Hierarchy of Document Schemas*, Programming and Computer Software, vol. 31, No. 6 (2005) 321-331.
Guoqiang, D. et al., *The Research on Interavtive short Message Reponse*, Workshop on Intelligent Information Technology Application, IEEE Conference Publications (2007) 206-209.
Herzog, G. et al., *Combining Alternatives in the Multimedia Presentation of Decision Support Information for Real-Time Control*, IFIP (1998) 15 pages.
International Preliminary Report on Patentability for Application No. PCT/IB2012/056513 dated May 19, 2015.
International Preliminary Report on Patentability for Application No. PCT/IB2012/056514 dated May 19, 2015.
International Preliminary Report on Patentability for Application No. PCT/IB2012/057774 dated Jun. 30, 2015.
International Preliminary Report on Patentability for Application No. PCT/IB2013/050375 dated Jul. 21, 2015.
International Preliminary Report on Patentability for Application No. PCT/IB2013/058131 dated May 5, 2015.
International Preliminary Report on Patentability for Application No. PCT/IB2014/060846 dated Oct. 18, 2016.
International Preliminary Report on Patentability for Application No. PCT/US2012/053115 dated Mar. 3, 2015.
International Preliminary Report on Patentability for Application No. PCT/US2012/053127 dated Mar. 3, 2015.
International Preliminary Report on Patentability for Application No. PCT/US2012/053128 dated Mar. 3, 2015.
International Preliminary Report on Patentability for Application No. PCT/US2012/053156 dated Mar. 3, 2015.
International Preliminary Report on Patentability for Application No. PCT/US2012/053183 dated Mar. 3, 2015.
International Preliminary Report on Patentability for Application No. PCT/US2012/061051 dated Mar. 3, 2015.
International Preliminary Report on Patentability for Application No. PCT/US2012/063343 dated May 5, 2015.
International Search Report and Written Opinion for Application No. PCT/IB2012/056513 dated Jun. 26, 2013.
International Search Report and Written Opinion for Application No. PCT/IB2012/056514 dated Jun. 26, 2016.
International Search Report and Written Opinion for Application No. PCT/IB2012/057773 dated Jul. 1, 2013.
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/IB2014/060846 dated Feb. 4, 2015.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053128 dated Jun. 27, 2013.
International Search Report and Written Opinion for Application No. PCT/US2012/053156 dated Sep. 26, 2013.
International Search Report and Written Opinion for Application No. PCT/US2012/053183 dated Jun. 4, 2013.
International Search Report and Written Opinion for Application No. PCT/US2012/061051 dated Jul. 24, 2013.
International Search Report and Written Opinion for Application No. PCT/US2012/063343; dated Jan. 15, 2014.
International Search Report and Written Opinion for Application No. PCT/IB62013/058131 dated Jul. 3, 2014.
Kottke, D. P. et al., *Motion Estimation Via Cluster Matching*, 8180 IEEE Transactions on Pattern Analysis and Machine Intelligence 16, No. 11 (Nov. 1994) 1128-1132.
Kukich K., *Knowledge-Based Report Generation: A Knowledge-Engineering Approach to Natural Language Report Generation*, Dissertation the the Interdisiplinary Department of Information Science, University of Pittsburg (Aug. 1983) 260 pages.
Leonov, A. v. et al., *Construction of an Optimal Relational Schema for Storing XML Documents in an RDBMS Without Using DTD/XML Schema*, Programming and Computer Software, vol. 30, No. 6 (2004) 323-336.
Notice of Allowance for U.S. Appl. No. 14/023,023 dated Apr. 11, 2014.
Notice of Allowance for U.S. Appl. No. 14/023,056 dated Apr. 29, 2014.
Notice of Allowance for U.S. Appl. No. 14/027,684 dated Mar. 21, 2016.
Notice of Allowance for U.S. Appl. No. 14/027,775 dated Aug. 12, 2015.
Notice of Allowance for U.S. Appl. No. 14/027,775 dated Sep. 10, 2015.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.
Notice of Allowance for U.S. Appl. No. 14/634,035 dated Mar. 30, 2016.
Office Action for U.S. Appl. No. 14/023,023 dated Mar. 4, 2014.
Office Action for U.S. Appl. No. 14/023,056 dated Nov. 21, 2013.
Office Action for U.S. Appl. No. 14/027,684 dated Oct. 6, 2015.
Office Action for U.S. Appl. No. 14/027,775 dated Jul. 13, 2015.
Office Action for U.S. Appl. No. 14/311,806 dated Jun. 10, 2016.
Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.
Office Action for U.S. Appl. No. 14/634,035 dated Dec. 10, 2015.
Office Action for U.S. Appl. No. 14/634,035 dated Mar. 30, 2016.
Office Action for U.S. Appl. No. 15/022,420 dated May 18, 2017.
Office Action for U.S. Appl. No. 15/074,425 dated May 10, 2017.
Office Action for U.S. Appl. No. 15/186,927 dated May 1, 2017.
Office Action for U.S. Appl. No. 15/188,423 dated Oct. 23, 2017.
Office Action for U.S. Appl. No. 15/421,921 dated Sep. 27, 2017.
Perry, B. et al., *Automatic Realignment of Data Structures to Improve MPI Performance*, Networks (ICN), 2010 Ninth International Conference on Year: 2010, IEEE Conference Publilcations (2010) pp. 42-47.
Premchaiswadi, W. et al., *Enhancing Learning Systems by using Virtual Interactive Classrooms and Web-based Collaborative Work*, Education Engineering (EDUCON) IEEE Conference Publications, (2010) 1531-1537.
Quinlan, J. R., *Induction of Decision Trees*, Machine Learning, Kluwer Academic Publishers, vol. 1, No. 1 (Jan. 1, 1986) 81-106.
Radev, D. R. et al., *Generating Natural Language Summaries from Multiple On-Line Sources*, Association of Computational Linguistics, vol. 24, No. 3 (1998) 469-500.
Reiter, E. et al., *Building Applied Natural Language Generation Systems*, Natural Language Engineering 1 (1) (1995) 31 pages.
Shaw, J.; "*Clause Aggregation Using Linguistic Knowledge*;" Proceedings of IWNLG; pp. 138-147; dated Jan. 1998; retrieved from <http://acl.ldc.upenn.edu/W/W98/W98-1415.pdf>.
Spillner, J. et al., *Algorithms for Dispersed Processing*, Utility and Cloud Computing (UC), 204 IEEE/ACM 7th International Conference on Year: 2014, IEEE Conferenced Publications (2014) pp. 914-921.
Statement in accordance with the Notice from the European patent Office dated Oct. 1, 2007 concerning business methods (OJ EPO Nov. 2007, 592-593, (XP002456414) 1 page.
Takeuchi, Y. et al., *Human Prosocial Response to Emotive Facial Expression of Interactive Agent*, The 15th IEEE International Syposium on Robot and Human Interactive Communication (2006), 680-685.
U.S. Appl. No. 13/186,308; entitled "Method and Apparatus for Triggering the Automatic Generation of Narratives".
U.S. Appl. No. 13/186,329; entitled "Method and Apparatus for Triggering the Automatic Generation of Narratives".

(56) References Cited

OTHER PUBLICATIONS

U.S. Appl. No. 13/186,337; entitled "Method and Apparatus for Triggering the Automatic Generation of Narratives" filed Jul. 19, 2011.
U.S. Appl. No. 13/464,635; entitled "Use of Tools and Abstration in a Configurable and Portable System for Generating Narratives" filed May 4, 2012.
U.S. Appl. No. 13/464,675; entitled "Configurable and Portable System for Generating Narratives" filed May 4, 2012.
U.S. Appl. No. 13/464,716; entitled "Configurable and Portable System for Generating Narratives" filed May 4, 2012.
U.S. Appl. No. 12/779,636; entitled "System and Method for Using Data to Automatically Generate a Narrative Story" filed May 13, 2010.
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10, 2013.
U.S. Appl. No. 14/027,775; entitled "Method and Apparatus for Interactive Reports;" filed Sep. 16, 2013.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 15/186,927; filed Jun. 20, 2016; In re: Sripada, entitled Method, Apparatus, and Computer Program Product for User-Directed Reporting.
U.S. Appl. No. 14/961,222, entitled Method and Apparatus for Interactive Reports; In re: Dale et al., filed Dec. 7, 2015.
U.S. Appl. No. 14/311,806; entitled Method and Apparatus for Alert Validation; In re: Reiter, filed Jun. 23, 2014.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.
Voelz, D. et al., *Rocco: A RoboCup Soccer Commentator System*, German Research Center for Artificial Intelligence DFKI GmbH (1999) 11 pages.
Yu, J. et al., *Choosing the Content of Textual Summaries of Large Time-Series Data Sets*, Natural Language Engineering (Jan. 1, 2007) pp. 1-28.
Office Action for U.S. Appl. No. 14/760,848 dated May 11, 2017.
U.S. Appl. No. 14/760,848, entitled Method and Apparatus for Document Planning; In re: Sripada; filed Jul. 14, 2015.
Notice of Allowance for U.S. Appl. No. 15/421,921 dated Mar. 14, 2018.
Office Action for U.S. Appl. No. 14/961,222 dated Mar. 3, 2018.
Office Action for U.S. Appl. No. 15/074,425 dated Feb. 26, 2018.
Office Action for U.S. Appl. No. 15/186,927 dated Jul. 3, 2018.
Office Action for U.S. Appl. No. 15/186,927 dated Nov. 17, 2017.
Office Action for U.S. Appl. No. 15/188,423 dated Jul. 20, 2018.
Applicant Initiated Interview Summary for U.S. Appl. No. 14/822,349 dated Feb. 13, 2018.
Notice of Allowance for U.S. Appl. No. 14/634,074 dated Jun. 30, 2015.
Office Action for U.S. Appl. No. 14/634,074 dated Apr. 17, 2015.
Office Action for U.S. Appl. No. 14/822,349 dated Jan. 20, 2017.
Office Action for U.S. Appl. No. 14/822,349 dated Jun. 27, 2018.
Office Action for U.S. Appl. No. 14/822,349 dated Nov. 13, 2017.
Office Action for U.S. Appl. No. 14/822,349 dated Sep. 2, 2016.
U.S. Appl. No. 14/634,074, entitled Method and Apparatus for Configurable Microplanning; In re: Reiter; filed Feb. 27, 2015.
U.S. Appl. No. 14/822,349;entitled Method and Apparatus for Configurable Microplanning; In re: Reiter, filed Aug. 10, 2015.
Buschmeier et al, "An alignment-capable microplanner for natural language generation," Proceedings of the 12th European Workshop on Natural Language Generation. Association for Computational Linguistics, pp. 82-89, (2009).
Krahmer et al., "Computational Generation of Referring Expressions: A Survey," In Computational Linguistics, 38:173-218, (2012).
Paraboni, "Generating Referring Expressions: Making Referents Easy to Identify," In Computational Liguistics, 33(2):229-254, (2007).
Paraboni, "Generating references in hierarchical domains: the case of Documents Deixis," University of Brighton PhD thesis, pp. 1-207, (2003).
Siddharthan et al., "Generating referring expressions in open domains," In Proceedings of ACL 2004, pp. 1-8, (2004).
Theune, "Natural Language Generation for dialogue: system survey," Thesis, University of Twene, pp. 1-47, (2003).
Notice of Allowance for U.S. Appl. No. 14/634,119 dated Feb. 2, 2016.
Notice of Allowance for U.S. Appl. No. 14/961,222 dated Nov. 16, 2018.
Office Action for U.S. Appl. No. 14/634,119 dated Apr. 21, 2015.
Office Action for U.S. Appl. No. 14/634,119 dated Oct. 23, 2015.
Office Action for U.S. Appl. No. 14/760,848 dated Oct. 2, 2018.
Office Action for U.S. Appl. No. 15/074,425 dated Nov. 27, 2018.
Office Action for U.S. Appl. No. 15/093,337 dated Apr. 4, 2018.
Office Action for U.S. Appl. No. 15/093,337 dated Dec. 14, 2018.
Office Action for U.S. Appl. No. 15/093,337 dated Jun. 29, 2017.
Office Action for U.S. Appl. No. 15/188,423 dated Oct. 30, 2018.
Office Action for U.S. Appl. No. 16/009,006 dated Dec. 3, 2018.

\* cited by examiner

METHOD AND APPARATUS FOR
DOCUMENT PLANNING

TECHNOLOGICAL FIELD

Embodiments of the present invention relate generally to natural language generation technologies and, more particularly, relate to a method, apparatus, and computer program product for document planning.

BACKGROUND

Natural Language Generation (NLG) systems operate to transform raw input data that is expressed in a non-linguistic format into a linguistically-expressed format. In this manner, data presented in a readily machine-readable format (e.g., a spreadsheet, binary data file, or the like) may be expressed in terms that are more readily consumable by human beings (e.g., sentences, paragraphs, and the like). As an example, NLG systems may be used to monitor and/or analyze datastreams to detect noteworthy events indicated by the data from the datastream, and output natural language notifications that notify users of the occurrence of the event in a manner that assists with interpretation of the data.

As a particular example, raw input data may take the form of a value of a stock market index over time and, as such, the raw input data may include data that is suggestive of a time, a duration, a value and/or the like. An NLG system may be configured to input the raw input data and output text that linguistically describes the value of the stock market index; for example, "securities markets rose steadily through most of the morning, before sliding downhill late in the day."

Data that is input into a NLG system may be provided in a variety of formal structures. An example recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information.

The process of generating natural language may include multiple steps and processes. For example, input data may be analyzed to detect the occurrence of particular events, patterns, or inferences from the input data. These events, patterns, and inputs may be translated into a series of messages. Through a process known as document planning, particular messages may be selected and organized to create a document plan. The document plan may then be utilized to generate output natural language through processes known as microplanning and realizing.

Different domains often require different methods of selecting messages for use in a natural language generation process. For example, events, patterns, and inferences that are relevant to a series of messages derived from data provided by oil rig equipment require different analysis techniques than events, patterns, and inferences that are relevant in a medical context, which in turn are different from message selection and document planning techniques employed in a meteorological or financial domain. As such, generating document plans for different domains requires a significant investment of developer time and resources to generate code to select and organize messages into a document plan for each particular domain. Through applied effort, ingenuity, and innovation, Applicant has solved many of these identified problems by developing solutions that are embodied by the present invention, which is described in detail below.

BRIEF SUMMARY

Methods, apparatuses, and computer program products are described herein that are configured to be embodied as and/or performed by a document planner in a natural language generation system. In some example embodiments, a method for generating a document plan for use in a natural language generation process is provided. The method includes receiving a document plan template and a message store. The document plan template includes program code defining the structure and content of a document plan. The method also includes processing, by a processor, the document plan template to determine one or more messages from the message store for inclusion in the document plan, and generating the document plan, wherein a structure and a content of the document plan is determined at least based on the determined one or more messages and the document plan template. The program code may be encoded in a markup language.

At least one portion of the document plan may be identified with a particular tag of the markup language. The program code may indicate the presence of at least one message within a document plan tree structure, and processing the document plan may include generating at least one query to retrieve the at least one message based on the program code and executing the at least one query against the message store. The program code may define at least a message type of the at least one message, and the query may return at least one message of the message type. The document plan may include a document tree with a plurality of nodes, one or more relationships among the nodes may be defined by processing the document plan template, and one or more messages from the message store may be assigned to at least one of the plurality of nodes based on processing the document plan template. The document plan may define one or more rhetorical relationships among messages included in the document plan. The program code may include at least one of a single message query executed by the processor against the message store, a multiple message query executed by the processor against the message store, or a conditional statement evaluated by the processor. The document plan template may be associated with a particular domain model, and the processing of the document plan template may be based at least in part on the domain model. In some embodiments, the method may also include receiving a planner schema, and validating the document plan template using the planner schema. The method may further include generating a natural language document based on the document plan.

The program code may include at least one conditional statement that, based on an evaluation of the conditional statement during processing of the document plan, determines whether to include a particular sentence in the document plan. The condition of the conditional statement may be the presence of a particular message with a particular message type is present within the message store.

Yet further embodiments may provide an apparatus for generating a document plan for use in a natural language generation process. The apparatus includes processing circuitry configured to implement a document planner by at least receiving a document plan template and a message store. The document plan template includes program code defining the structure and content of a document plan. The processing circuitry is further configured to generate the document plan by processing the document plan template to determine one or more messages from the message store for inclusion in the document plan, generating the document plan. A structure and a content of the document plan is determined at least based on the determined one or more messages and the document plan template.

The program code may be encoded in a markup language. At least one portion of the document plan may be identified with a particular tag of the markup language. The program code may indicate the presence of at least one message within a document plan tree structure, and the processing circuitry may be configured to process the document plan by at least generating at least one query to retrieve the at least one message based on the program code, and executing the at least one query against the message store. The program code may define at least a message type of the at least one message, and the query may return at least one message of the message type.

The document plan may include a document tree with a plurality of nodes, and one or more relationships among the nodes may be defined by processing the document plan template. One or more messages from the message store may be assigned to at least one of the plurality of nodes based on processing the document plan template. The document plan may define one or more rhetorical relationships among messages included in the document plan. The program code may include at least one of a single message query executed by the processor against the message store, a multiple message query executed by the processor against the message store, or a conditional statement evaluated by the processor. The document plan template may be associated with a particular domain model, and processing of the document plan template may be based at least in part on the domain model.

The processing circuitry may be further configured to implement the document planner by at least receiving a planner schema, and validating the document plan template using the planner schema. The processing circuitry may be further configured to generate a natural language document based on the document plan. The program code may include at least one conditional statement that, based on an evaluation of the conditional statement during processing of the document plan, determines whether to include a particular sentence in the document plan. The condition of the conditional statement may be the presence of a particular message with a particular message type is present within the message store.

Embodiments may also provide a computer readable storage medium. The computer readable storage medium includes program instructions for generating a document plan for use in a natural language generation process. The program instructions include program instructions for receiving a document plan template and a message store. The document plan template includes program code defining the structure and content of a document plan. The program instructions may also include program instructions for processing the document plan template to determine one or more messages from the message store for inclusion in the document plan, and program instructions for generating the document plan. A structure and a content of the document plan is determined at least based on the determined one or more messages and the document plan template.

The program code may be encoded in a markup language. At least one portion of the document plan may be identified with a particular tag of the markup language. The program code may indicate the presence of at least one message within a document plan tree structure. The program instructions for processing the document plan may include program instructions for generating at least one query to retrieve the at least one message based on the program code, and program instructions for executing the at least one query against the message store. The program code may define at least a message type of the at least one message, and the query may return at least one message of the message type. The document plan may include a document tree with a plurality of nodes. One or more relationships among the nodes may be defined by processing the document plan template, and one or more messages from the message store may be assigned to at least one of the plurality of nodes based on processing the document plan template. The document plan may define one or more rhetorical relationships among messages included in the document plan. The program code may include at least one of a single message query executed by the processor against the message store, a multiple message query executed by the processor against the message store, or a conditional statement evaluated by the processor. The document plan template may be associated with a particular domain model, and the program instructions for processing the document plan template may be determined based at least in part on the domain model.

The program instructions may further include program instructions for receiving a planner schema, and program instructions for validating the document plan template using the planner schema. The program instructions may also include program instructions for generating a natural language document based on the document plan. The program code may include at least one conditional statement that, based on an evaluation of the conditional statement during processing of the document plan, determines whether to include a particular sentence in the document plan. The condition of the conditional statement may be the presence of a particular message with a particular message type is present within the message store.

Yet further embodiments may provide a method for authoring a document plan template. This method includes providing an interface for selecting one or more document structure elements and one or more document content elements, receiving, via the interface, input selecting at least one of the document structure elements and the document content elements, and generating, using a processor, a markup language document that, when processed by a document planner, generates a document plan having the selected document structure elements and document content elements. The method may also include receiving a document planner schema defining a schema for the markup language document, and determining at least one of the document structure elements or the document content elements provided for selection within the interface based at least in part by the document planner schema. Embodiments of the method may also include receiving, via the interface, a selection of a particular domain model; and determining at least one of the document structure elements or the document content elements based at least in part on the particular domain model.

Further embodiments may include an apparatus for authoring a document plan template. The apparatus includes processing circuitry configured to generate the document plan template by at least providing an interface for selecting one or more document structure elements and one or more document content elements, receiving, via the interface, input selecting at least one of the document structure elements and the document content elements, and generating a markup language document that, when processed by a document planner, generates a document plan having the selected document structure elements and document content elements. The processing circuitry may be further configured to generate the document plan template by at least receiving a document planner schema defining a schema for the markup language document, and determining at least one of the document structure elements or the document content elements provided for selection within the interface based at least in part by the document planner schema. The processing circuitry may be further configured to generate the document plan template by at least receiving, via the interface, a selection of a particular domain model, determining at least one of the document structure elements or the document content elements based at least in part on the particular domain model.

Additional embodiments may include a computer readable storage medium comprising program instructions for authoring a document plan template. The program instructions include program instructions for providing an interface for selecting one or more document structure elements and one or more document content elements, program instructions for receiving, via the interface, input selecting at least one of the document structure elements and the document content elements, and program instructions for generating a markup language document that, when processed by a document planner, generates a document plan having the selected document structure elements and document content elements. The program instructions may further include program instructions for receiving a document planner schema defining a schema for the markup language document, and program instructions for determining at least one of the document structure elements or the document content elements provided for selection within the interface based at least in part by the document planner schema. The program instructions may also include program instructions for receiving, via the interface, a selection of a particular domain model, and program instructions for determining at least one of the document structure elements or the document content elements based at least in part on the particular domain model.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
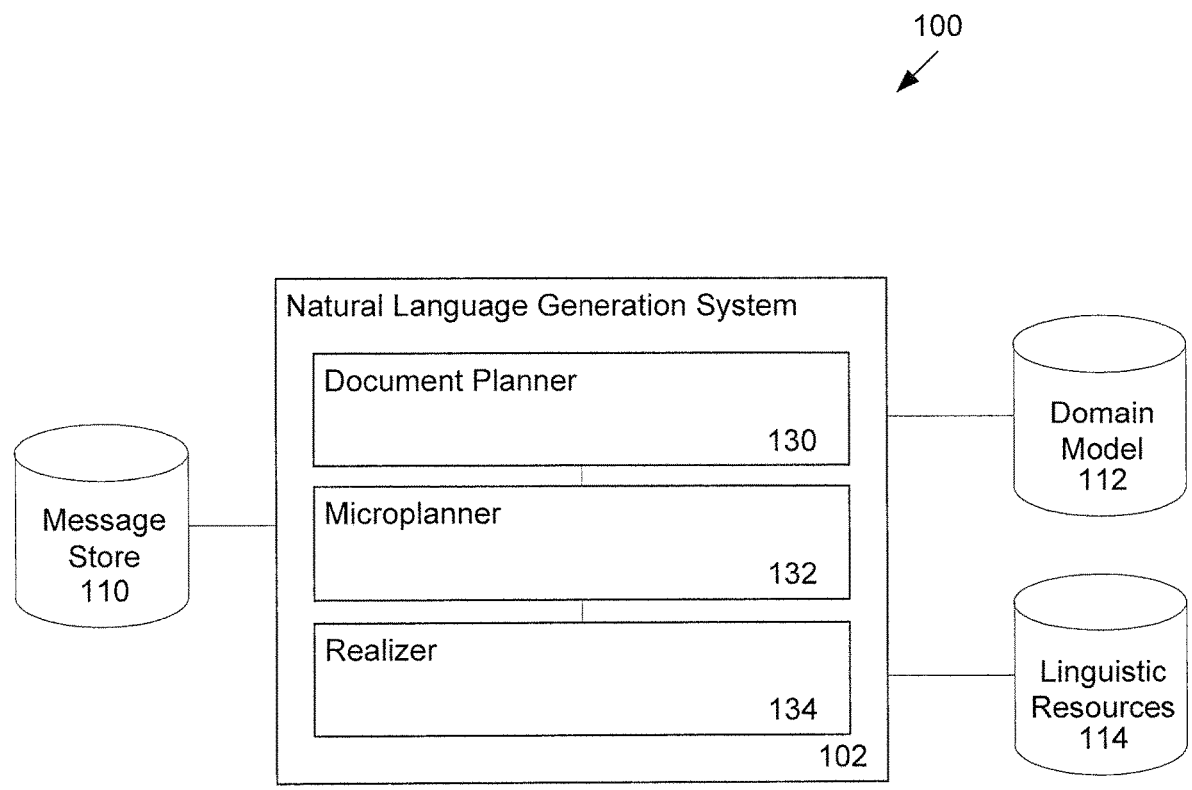
Figure 2:
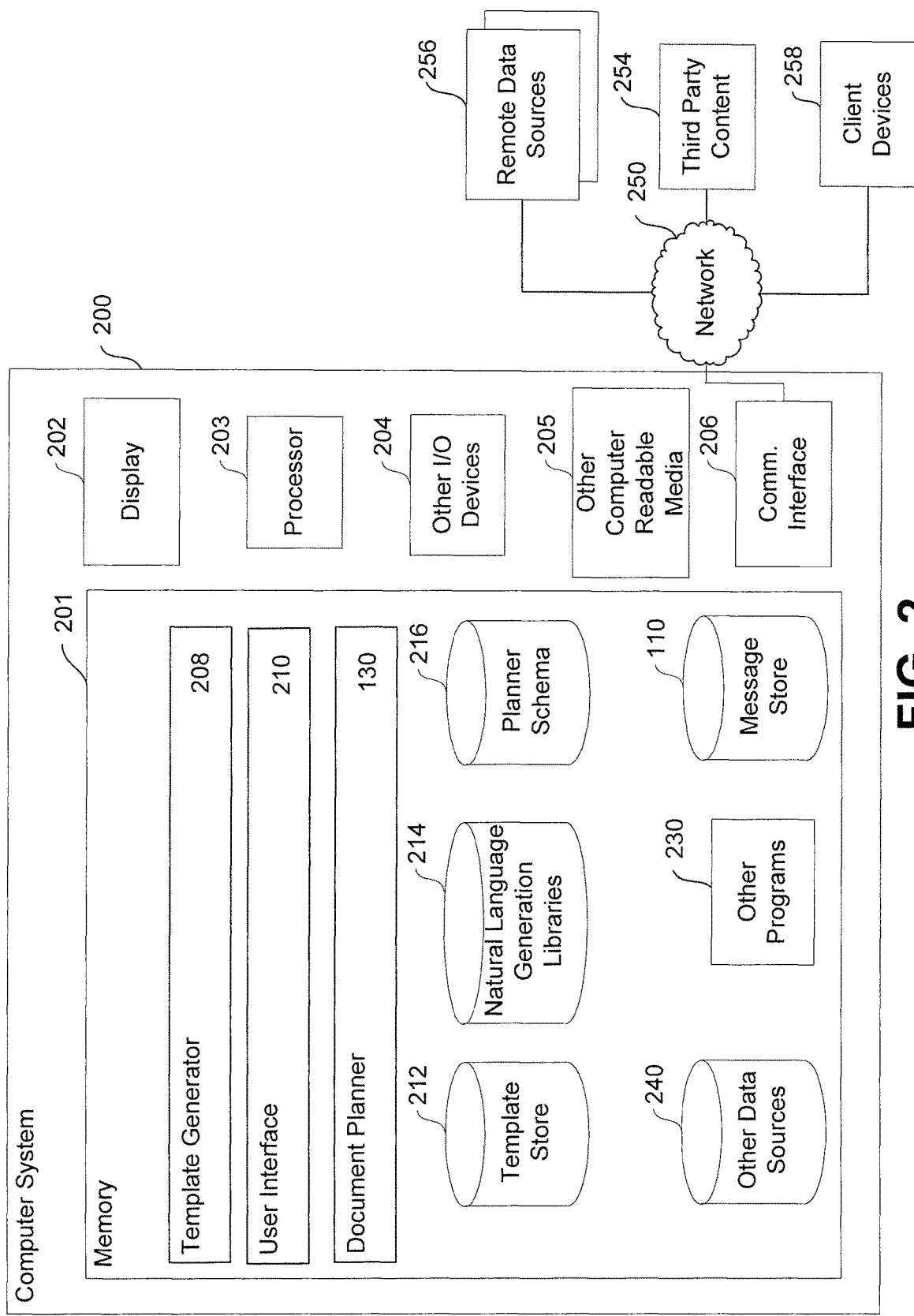
Figure 3:
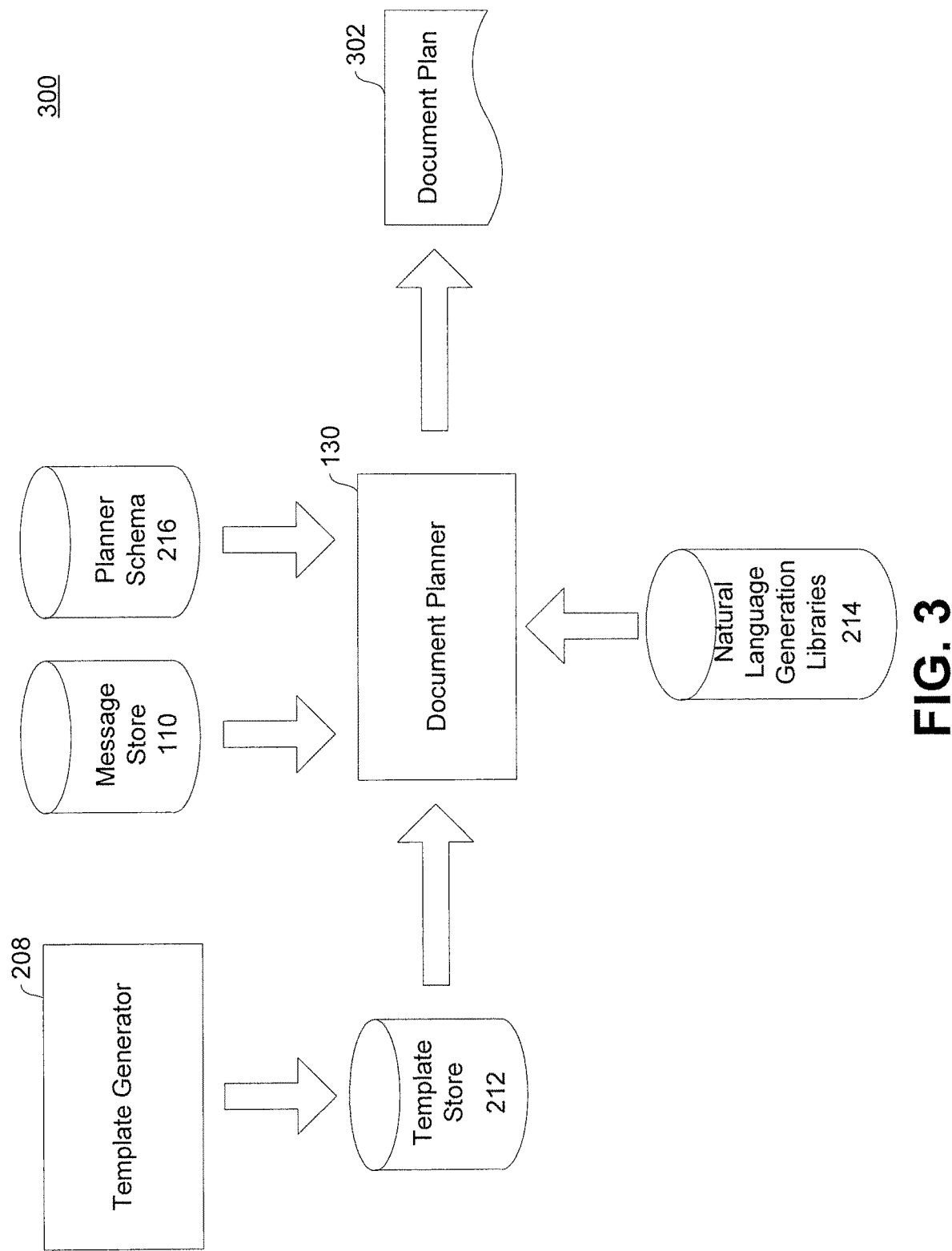
Figure 4:
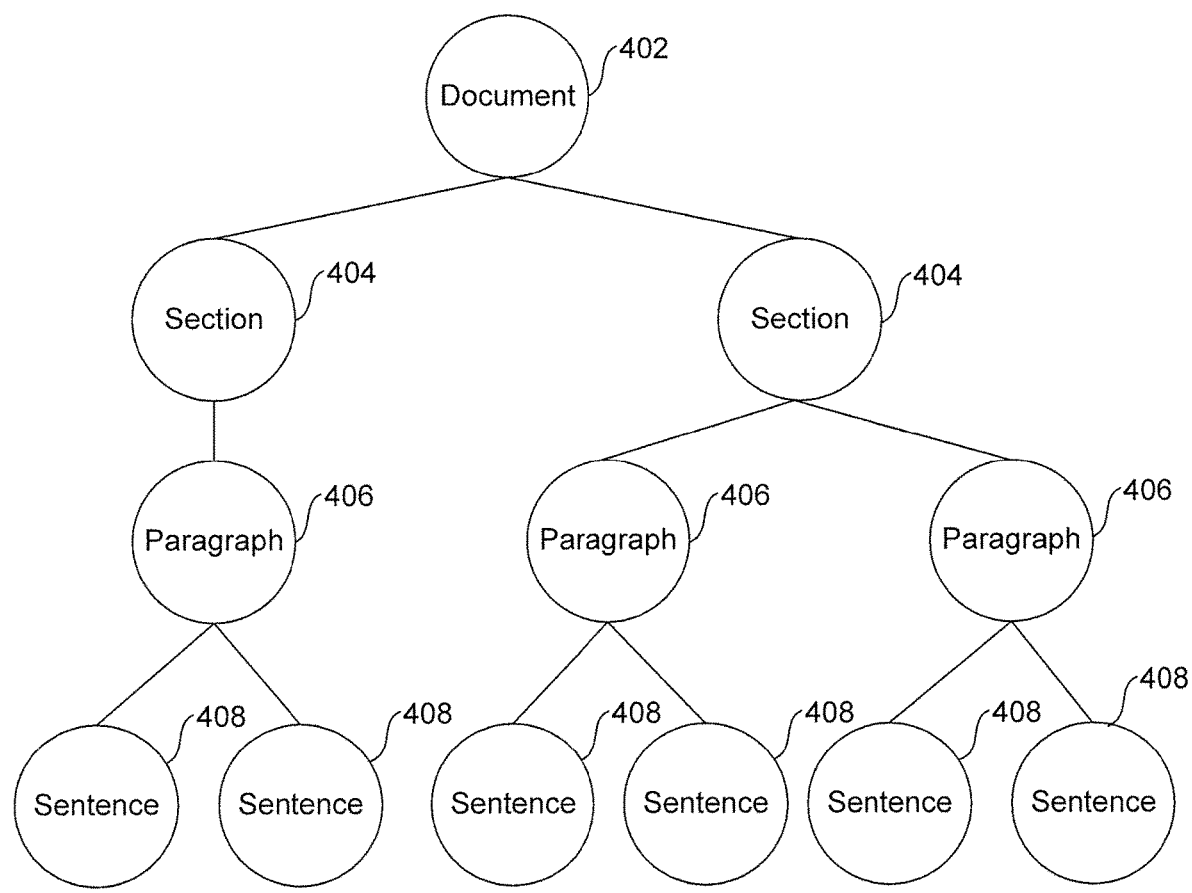
Figure 5:
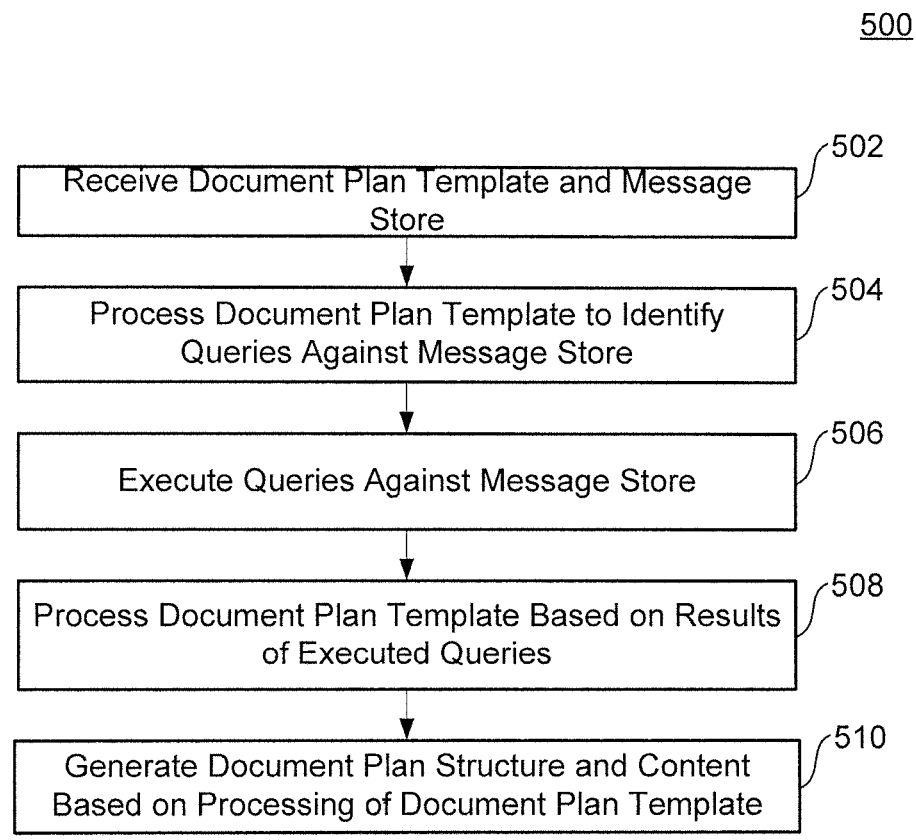

Having thus described embodiments of the invention in general terms, reference will now be made to the accompanying drawings, which are not necessarily drawn to scale, and wherein:

FIG. 1 is a schematic representation of a natural language generation environment that may benefit from some example embodiments of the present invention;

FIG. 2 illustrates a block diagram of an apparatus that embodies a natural language generation system for performing a document planning operation in accordance with some example embodiments of the present invention;

FIG. 3 illustrates a data flow among modules of a natural language generation system to facilitate generation of a document plan in accordance with some example embodiments of the present invention;

FIG. 4 illustrates an example tree structure incorporating multiple nodes of an example document plan template in accordance with some example embodiments of the present invention; and FIG. 5 illustrates a flow diagram of an example process for generating a document plan in accordance with embodiments of the present invention.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

Overview

As described above, generation of natural language from raw data may involve subtasks such as document planning, sentence planning and/or microplanning, and realization. Document planning may include the process of selecting and mapping fragments of data, information or the like (e.g. messages) into data structures (e.g. document plan trees or the like), such that the data structures can be further processed.

The stage of natural language generation known as sentence planning and/or microplanning may include the process of transforming, mapping or otherwise converting fragments of data, information or the like (e.g. messages) into specifications (e.g. phrase specifications, sentence plans or the like), such that the specifications can be further processed by a realizer (e.g. a linguistic realization component).

The stage of natural language generation known as realization may refer to applying the mechanical aspects of language to the specifications generated during the sentence planning and/or microplanning operation. This process may include application of the rules of syntax, punctuation and orthography to the contents of a phrase specification in order to produce a fragment of natural language text.

A document planner, such as the document planner described herein, may configured to select information (e.g. messages) to be communicated in a text and to determine how to order and structure the selected information into sentences, paragraphs, and sections in order to generate a document plan, which may be employed by other elements of a natural language generation pipeline to generate an output of a natural language generation document.

The task of document planning may include selecting a subset of messages from an input message set that fulfills the informational requirements of the user (e.g. a message store), partitioning the selected subset of messages into sentences and paragraphs, and ordering the messages for each of the partitions. Processes that perform these tasks by exhaustive search based methods by analyzing all possible combinations for message selections, partitions, and orders are typically very computationally expensive. As such, a knowledge-based approach may be appropriate for document planning. In addition, it may not be possible to identify a single unique document plan because there could be more than one document plan appropriate for a particular communicative context. Therefore document planning may further involve finding an optimum document plan among a number of alternative document plans.

In some examples, and as is described herein, a document planner may be configured using top-down planning and bottom-up narrative optimization. Top-down planning is a type of document planning, used by a document planner, which may use schemas to define the structure of the document. A schema is a document that imposes constraints upon and defines the structure and content of a document plan. For example, a document plan schema may be an Extensible Markup Language (XML) schema which defines the form and structure of an XML document plan template. The document planner may employ a schema in conjunction with a document plan template in order to generate a document plan.

A document plan template may provide instructions for querying a message store to select messages and structure said messages to create a document plan tree. For example, the document plan template may identify various messages and rhetorical relationships between said messages that are relevant to the desired output document plan. When processed by the document planner, the messages and rhetorical relationships may be employed to execute a series of queries against a message store to identify the presence of said messages and to structure said messages into a document plan. To generate the document plan, the document planner may receive the document plan template, a schema defining the structure of the output document plan, and a set of messages.

In some embodiments, the selection and structure of the document plan template may be provided via a template generator application. This template generator may provide various methods and processes for assisting users with authoring of document plan templates, thereby simplifying the process of developing and editing document plans for different domains. For example, a template generator application may provide a user with an interactive integrated development environment (IDE) that allows the user to select from pre-populated lists of message types, message data values, rhetorical relationships between messages, and the like. Such an IDE may programmatically generate a document plan template based on the selections made by the user via the IDE, such as by automatically generating XML code based corresponding to the user's selections. Such a development environment may also utilize the document planner schema to ensure that the document plan template adheres to the proper syntax and other requirements for use by the document planner. Additionally or alternatively, embodiments may allow a user to independently author a document plan template without the use of an IDE. For example, the user may manually write XML code for the document plan template.

Exemplary Natural Language Generation System and Apparatus

FIG. 1 is an example block diagram of an example natural language generation environment 100 in accordance with some embodiments of the present invention. In some example embodiments, the natural language generation environment 100 comprises a natural language generation system 102, a message store 110, a domain model 112 and/or linguistic resources 114. The natural language generation system 102 may take the form of, for example, a code module, a component, circuitry, and/or the like. The components of the natural language generation environment 100 are configured to provide various logic (e.g. code, instructions, functions, routines and/or the like) and/or services related to a document planner.

A message store 110 is configured to store one or more messages that are accessible by the natural language generation system 102. Messages are language independent data structures that correspond to informational elements in a text and/or collect together underlying data, referred to as slots, arguments or features, which can be presented within a fragment of natural language such as a phrase or sentence. Messages may be represented in various ways; for example, each slot in a message may consist of a named attribute and its corresponding value; these values may recursively consist of sets of named attributes and their values, and each message may belong to one of a set of predefined types. The concepts and relationships that make up messages may be drawn from an ontology (e.g. a domain model 112) that formally represents knowledge about the application scenario.

In some examples, the domain model 112 is a representation of information about a particular domain. For example, a domain model may contain an ontology that specifies the kinds of objects, concepts and/or the like that may exist in the domain in concrete or abstract form, properties that may be predicated of the objects, concepts and the like, relationships that may hold between the objects, concepts and the like, and representations of any specific knowledge that is required to function in the particular domain.

In some examples, messages are created based on a requirements analysis as to what is to be communicated for a particular scenario (e.g. for a particular domain or genre). A message typically corresponds to a fact about the underlying data (for example, the existence of some observed event) that could be expressed via a simple sentence (although it may ultimately be realized by some other linguistic means). For example, to linguistically describe wind, a user may want to know a speed, a direction, a time period or the like, but the user may also want to know changes in speed over time, warm or cold fronts, geographic areas and or the like. In some cases, users do not even want to know wind speed values, but instead want an indication that describes the presence of a dangerous wind condition. Thus, a message related to wind speed may include fields to be populated by data related to the speed, direction, time period or the like, and may have other fields related to different time points, front information or the like. The mere fact that wind exists may be found in the data, but to linguistically describe "light wind" or "gusts" different data interpretation must be undertaken as is described herein.

In some examples, a message is created in an instance in which the raw input data warrants the construction of such a message. For example, a wind message would only be constructed in an instance in which wind data was present in the raw input data. Alternatively or additionally, while messages may correspond directly to observations taken from a raw data input, others may be derived from the observations by means of a process of inference or based on one or more detected events. For example, the presence of rain may be indicative of other conditions, such as the potential for snow at some temperatures.

Messages may be instantiated based on many variations of source data, such as, but not limited to, time series data, time and space data, data from multiple data channels, an ontology, sentence or phrase extraction from one or more texts, a text, survey responses, structured data, unstructured data and/or the like. For example, in some cases, messages may be generated based on text related to multiple news articles focused on the same or similar news stories in order to generate a news story; whereas in other examples, messages may be built based on survey responses and/or event data.

Messages may be annotated with an indication of their relative importance; this information can be used in subsequent processing steps or by the natural language generation system 102 to make decisions about which information may be conveyed and which information may be suppressed. Alternatively or additionally, messages may include information on relationships between the one or more messages or an indication that a message is a focus of discourse.

In some example embodiments, a natural language generation system, such as natural language generation system 102, is configured to generate phrases, sentences, text or the like which may take the form of natural language text. The natural language generation system 102 comprises, in some example embodiments, a document planner 130, a microplanner 132 and/or a realizer 134. The natural language generation system 102 may also be in data communication with the message store 110, the domain model 112 and/or the linguistic resources 114. In some examples, the linguistic resources 114 include, but are not limited to, text schemas, aggregation rules, reference rules, lexicalization rules and/or grammar rules that may be used by one or more of the document planner 130, the microplanner 132 and/or the realizer 134. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

The document planner 130 may be configured to generate or otherwise instantiate a document plan using the messages from the message store 110. Example embodiments of an apparatus for generating a document plan is described further below with respect to FIG. 2, and an example data flow for generating a document plan is described further below with respect to FIG. 3. The document planner 130 may be further configured to determine how to arrange messages from the message store to describe the patterns in the one or more data channels derived from the raw input data. The document planner 130 may comprise a content determination process that is configured to select the messages, such as the messages that contain a representation of the data that is to be output via a natural language text. For example, an intravenous feed message may be described prior to a milk feed message in output text describing the status of a baby's feeding. In other examples, an administration method message may be described after, but in relation to, a fluid details message.

The output of the document planner 130 may be a tree based structure that consists of sections, paragraphs, and sentences nodes. The selection and structuring of messages may be done through instructions specified in a document plan template, which is processed by the document planner along with the messages stored in the message store 110 and validated using a document planner schema. The document plan may be structured as a tree-structured object. In an instance in which a tree-structured object is chosen for the document plan, the leaf nodes of the document plan tree may contain the messages or pre-defined text to be presented in a document, and the intermediate nodes of the tree-structured object may be configured to indicate how the subordinate nodes are related (e.g. elaboration, consequence, contrast, sequence and/or the like) to each other, specify document structure (e.g. paragraph breaks), and/or the like. In some embodiments, nodes of the document plan tree may also contain parameters for use with a microplanner, such as microplanner 132. An example document tree structure is described further below with respect to FIG. 5.

The microplanner 132 is configured to construct a text specification based on the document plan output from the document planner 130, such that the document plan may be expressed in natural language. In some example embodiments, the microplanner 132 may perform aggregation, lexicalization and referring expression generation. In some examples, aggregation includes, but is not limited to, determining whether two or more messages can be combined together linguistically to produce a more complex sentence. For example, one or more events may be aggregated so that both of the events are described by a single sentence.

In some examples, the process of lexicalization includes, but is not limited to, choosing particular words for the expression of concepts and relations. For example, the phrase "along with" may be used to describe coinciding conditions or "administered" may be used to describe the causal event.

In some examples, the process of generating referring expressions includes, but is not limited to, choosing how to refer to an entity so that it can be unambiguously identified by the reader. For example, in a first sentence "John Smith" and "a heart rate alarm" may be used where "he" and "it" may be used in subsequent sentences.

In some embodiments, the output of the microplanner 132 is a tree-structured text specification where leaf nodes of the tree are phrase specifications, and where internal nodes of the tree express rhetorical relations between the leaf nodes. A phrase specification may correspond to a sentence or a sub-sentence fragment (e.g. a title). The phrase specifications may be produced from one or more messages. A phrase specification may be configured to contain one or more syntactic constituents (e.g. subject, verb, prepositional phrase and/or the like) and one or more syntactic features (e.g. tense).

A realizer 134 may be configured to traverse a text specification output by the microplanner 132 to express the text specification in natural language. The realization process that is applied to each phrase specification in the text specification may make use of a grammar (e.g. the grammar of the linguistic resources 114) which specifies the valid syntactic constituents in the language and further provides a way of mapping from phrase specifications into the corresponding natural language sentences. The output of the process is, in some example embodiments, a well-formed natural language text. In some examples, the natural language text may include embedded mark-up.

FIG. 2 illustrates an example computer system 200 executing a document planner in accordance with some example embodiments described herein. The computer system 200 may be employed to perform one or more functions of elements of a natural language system as described above with respect to FIG. 1. In the present example, the computer system 200 is depicted as performing the functions of the document planner 130. However, it should be readily appreciated that in some embodiments the computer system 200 may perform additional functions other than those of document planning, or that document planning functions may be apportioned over multiple computer systems, computing nodes, or the like.

The computer system 200 may be implemented as one or more general purpose or special purpose computing systems/devices used to implement the natural language generation system 102. In addition, the computer system 200 may comprise one or more distinct computing systems/devices and may span distributed locations. In some example embodiments, the natural language generation system 102 may be configured to operate remotely via a network. In other example embodiments, a pre-processing module or other module that requires heavy computational load may be configured to perform that computational load and thus may be on a remote device or server. Furthermore, each block shown may represent one or more such blocks as appropriate to a specific example embodiment. In some cases one or more of the blocks may be combined with other blocks. Also, the natural language generation system 102 may be implemented in software, hardware, firmware, or in some combination of the resources of the computer system 200 to achieve the capabilities described herein.

In the example embodiment depicted, the computer system 200 comprises a computer memory ("memory") 201, a display 202, one or more processors 203, one or more input/output devices 204 (e.g., keyboard, mouse, CRT or LCD display, touch screen, gesture sensing device and/or the like), other computer-readable media 205, and a communications interface 206. The processor 203 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 2 as a single processor, in some embodiments the processor 203 comprises a plurality of processors. The plurality of processors may be in communication with one another and may be collectively configured to perform one or more functionalities of the example document planner as described herein.

A template generator 208, a user interface 210, a document planner 130, a message store 110, a template store 212, natural language generation libraries 214, a planner schema 216, other data sources 240, and other programs 230 are shown residing in the memory 201. The memory 201 may comprise, for example, transitory and/or non-transitory memory, such as volatile memory, non-volatile memory, or some combination thereof. Although illustrated in FIG. 2 as a single memory, the memory 201 may comprise a plurality of memories. The plurality of memories may be embodied on a single computing device or may be distributed across a plurality of computing devices collectively configured to function as the example document planner. In various example embodiments, the memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of a natural language generation system, such as the natural language generation system 102, may be stored on and/or transmitted via the other computer-readable media 205. The components of the natural language generation system 102 may execute on one or more processors 203 and may be configured to enable operation of an example document planner, as described herein.

Alternatively or additionally, other code or programs 230 (e.g., an administrative interface, a web server, and the like) and potentially other data repositories, such as other data sources 240, also reside in the memory 201, and execute on one or more processors 203. Of note, one or more of the components in FIG. 2 may not be present in any specific implementation. For example, some embodiments may not provide other computer readable media 205 or a display 202.

The template generator 208 and the document planner 130 may be executed by the processor 203 to configure the computer system 200 to generate a document plan using a document plan template, a document planner schema 216, and the message store 110. The document plan template may be selected from the template store 212. The document plan template may be generated to configure the document planner 130 to generate a particular type of document plan or a document plan with a particular structure. For example, the document plan template may provide a document plan for a particular domain type of message (e.g., weather messages, equipment status messages, clinical messages), and/or a particular type of output document (e.g., a notification of urgent events, a summary of data received over time, notification of a change in a trend of a particular measured value). In some embodiments, the template store 212 comprises a plurality of documents encoded in a markup language format (e.g., XML). An example of document plan template data encoded in such a format is described further below with respect to FIG. 4.

The planner schema 216 may be employed to validate the document plan template selected from the template store 212 and assist with generation of the document plan. The planner schema 216 may define required values and attributes of an input template, and assist the document planner 130 with verifying that the structure of the document plan template is correct for use by the document planner 130

The template generator 208 may be employed to assist with authorship of document plan templates for use with the document planner 130. As described above, different domains or document types may require different document structures, different message selections, or the like. The template generator 208 may thus assist with generation of different document plan templates to facilitate the customization of document plans for particular uses. For example, a document plan used to report the maintenance history of a given piece of equipment may be generated using a different template from a document plan used to notify a user of an urgent equipment malfunction, as different information is relevant to the reader for each document plan (e.g., long term maintenance status over time vs. an emergency malfunction. As a result, different document plan templates would be used to generate the document plans for each of these documents, even if the documents were generated using the same message store. It should be appreciated that a single data file may include multiple document plan templates. For example, a given file may include a set of templates, each with its own unique identifier, where each template corresponds to a different document and content structure. Additionally or alternatively, a single file may correspond to a single template in some embodiments.

The template generator 208 may thus assist a user with development and customization of document plan templates to meet the needs of the user's particular domain and use cases. The template generator 208 may include an integrated development environment (IDE) that facilitates development of the document plan template. For example, the template generator 208 may be aware of the particular message types available to the user for selection, possible data values associated with each message type, possible rhetorical relationships between those messages, and the like, and display such data to the user as the user authors the document plan template. In some embodiments, the template generator 208 may notify the user of syntax errors, highlight particular code elements based on data types, provide drop-down input selection based on available data values, or the like. In some embodiments, the template generator 208 may further access the planner schema 216 to perform a pre-validation of a document plan template generated by a user in order to verify that the generated document plan is syntactically correct and compatible with the planner schema. Pre-validation may also include checking of attributes defined within the document plan template, such as verifying that attributes that must be paired are properly paired together, and standalone attributes are properly not paired with other attributes. The template generator 208 may further provide the ability to select a particular domain or message store. For example, if the user selects a "weather" domain, then the template generator 208 may pre-populate certain fields and interface controls with message types and values that may be stored in a message store of weather data, while if the user selects a "clinical" domain, then the same fields and interface controls may be populated with message types and values that may be stored within a message store of clinical data.

The natural language generation system 102 may be further configured to provide functions such as those described with reference to FIG. 1. The natural language generation system 102 may interact with the network 250, via the communications interface 206, with remote data sources 256 (e.g. remote reference data, remote lexicalization rules, remote aggregation data, remote genre parameters and/or the like), third-party content providers 254 and/or client devices 258. The network 250 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instance the network 250 may take the form of the internet or may be embodied by a cellular network such as an LTE based network. In this regard, the communications interface 206 may be capable of operating with one or more air interface standards, communication protocols, modulation types, access types, and/or the like. The client devices 258 may include desktop computing systems, notebook computers, mobile phones, smart phones, personal digital assistants, tablets and/or the like.

In an example embodiment, the document planner 130, the template generator 208, and/or other components/modules of the natural language generation system 102 may be implemented using standard programming techniques. For example, the document planner 130 may be implemented as a "native" executable running on the processor 203, along with one or more static or dynamic libraries. In other embodiments, the natural language generation system 102 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the natural language generation system 102, such as by using one or more application programming interfaces can be made available by mechanisms such as through application programming interfaces (API) (e.g. C, C++, C #, and Java); libraries for accessing files, databases, or other data repositories; through scripting languages such as JavaScript; or through Web servers, FTP servers, or other types of servers providing access to stored data. The message store 110, the domain model 112 and/or the linguistic resources 114 may be implemented as one or more database systems, file systems, or any other technique for storing such information, or any combination of the above, including implementations using distributed computing techniques. Alternatively or additionally, the message store 110, the domain model 112 and/or the linguistic resources 114 may be local data stores but may also be configured to access data from the remote data sources 256.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the natural language generation system 102 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Exemplary Document Planning Data Flow

FIG. 3 depicts an example of a dataflow 300 employed for generating a document plan in accordance with embodiments of the present invention. As described above, a document planner 130 may generate a document plan 302 by using a document plan template to retrieve, organize, and structure messages and message relationships into a document plan 302. In the present example, one or more document plan templates are generated by a template generator 208 and stored within a template store 212. The document planner 130 may access a particular template or templates within the template store 212 to perform a document planning operation. The document planning operation may include retrieving one or more messages from the message store 110, such as by executing one or more queries against the datastore. In some embodiments, the document plan template is parsed by the document planner to identify one or more functions stored within a set of natural language generation libraries 214. These functions, when executed, may cause execution of queries that retrieve messages defined by the document plan template from the message store 110. These messages may be organized by the document planner 130 in accordance with the document plan template to generate the document plan 302. The dataflow will now be described in further detail in sequence from authoring of the document plan template stored in the template store 212 to generation of the document plan 302.

As described above with respect to FIG. 2, the template generator 208 may provide functionality allowing a user to author or otherwise generate a document plan template. For example, the user may specify particular criteria for including particular messages, rhetorical relationships between messages, and/or other instructions that are used by the document planner 130 to construct a document plan 302 from a set of messages stored in a message store 110.

In some embodiments, the document plan template is written as an XML document. XML tags may define the placement, selection, and ordering of messages, sections, paragraphs, and sentences within the document plan, along with criteria for including particular sections, which messages to include in the sections, and the like. The document plan template may also specify certain static text for use in any document plan generated using the planned template. Relationships between messages, criteria for selecting particular messages, conditional formatting, message query structure, and the like as specified in an example implementation of a document plan template are described further below with respect to FIG. 4.

Upon generation of the document plan template by the template generator 208, a document plan template may be stored within the template store 212. The template store 212 may be accessible by the document planner to select a particular template for use in a document plan generation operation. For example, the document planner 130 may select a particular template to generate a new document plan in response to various criteria, such as receiving a manual instruction from a user to generate a document plan, in response to receiving an indication from a monitoring application that a particular event has occurred (e.g., an application monitoring a datastream used to generate messages stored in the message store may notify the document planner that a document of a certain type should be created), in response to a particular action occurring as part of an NLG pipeline (e.g., a NLG generation system may notify the document planner that a document should be generated using a particular template after completion of a data analysis operation), or in response to various other criteria.

Upon selecting the document plan template from the template store 212, the document planner may parse the document plan template to access the message store 110. In some embodiments, accessing of the message store 110 is performed through the use of one or more functions defined within a set of natural language generation libraries 214.

For example, the document planner may execute queries in various query languages (e.g., Structured Query Language (SQL), Resource Description Framework (RDF) or the like) to retrieve the messages indicated by the document plan template. In some embodiments, the document plan template may also define additional criteria for inclusion of certain messages, document structures, or rhetorical relationships based on the contents of the message store. For example, a certain paragraph or section may only be included in the document plan if a message of a certain type exists within the message store, or a paragraph for a particular date is only included if at least one message has a value for the particular date. The document planner 130 may query the datastore to determine whether such criteria have been met. As such, the data requested from the datastore by the document planner may be determined by the document plan template. In this manner, an author of the document plan template may obtain access to the message store without the need to write code to specifically query the message store. Instead, the author only requires a working knowledge of the content and syntax needed to specify the document plan template.

Prior to generating the document plan or querying the message store, the document plan template may be validated using the planner schema 216. The planner schema 216 may identify various constraints and structures required within the document plan template to ensure that all necessary data is present so that the document plan template may be processed by the document planner 130 to generate a document plan. As such, the document planner 130 may utilize the planner schema 216 to confirm that the document plan template conforms to the schema prior to using the document plan template in a document plan template generation operation.

The document planner 130 uses the message selections and document structure specified in the document plan template to select and organize messages from the message store 110. These messages and document structure are used to generate a document plan 302. The document plan may include each of the selected messages and the rhetorical relationships between said messages. The document plan may further include the order and organization of the messages (e.g., sentences, paragraphs, sections, chapters, and the like) which are used by other processes in an NLG pipeline (e.g., a microplanner and realizer, as described above with respect to FIG. 1), to generate a set of natural language from the document plan.

Exemplary Document Plan Template

FIG. 4 depicts an example implementation of a document plan template 400 structure in accordance with some example embodiments. As described above, a document plan template may be implemented using a markup language, such as XML. Embodiments of a document plan may include a hierarchical relationship between different document sections that provide structure and organization to a document plan that is generated using the document plan template. For example, a document plan template may have a document node 402 specifying information about the document plan template, such as the schema used to validate the document plan template, an identifier for the template, or the like. Certain templates may also have associated attributes. For example, a given template may be identified as a "root" template, such that other templates extend from the root template. Multiple root templates may be defined within the same data file. The document node 402 may have child nodes corresponding to sections of the document. These section nodes 404 may define section breaks in the document. Each section node 404 may also have an identifier and one or more paragraph nodes 406. Paragraph nodes 406 may further have individual sentence nodes 408.

Although nodes are described herein as either document nodes, section nodes, paragraph nodes, and sentence nodes, it should be readily appreciated that various additional and alternative relationships may exist between nodes of a document plan template. For example, a document plan template may have chapter nodes that define chapter breaks in the document, text nodes which identify static text strings, or the like. Furthermore, in some embodiments certain node types may be omitted or optional. As an example, in some embodiments a particular section node may have a single sentence node, with no associated paragraph node.

In some embodiments, a document plan template may specify one or more other templates. For example, a node of a first document plan template may reference another document plan template to be used as a sub-template. The sub-template may define the structure of a particular section, chapter, or the like of the first document plan template. In this manner, document plans may be generated recursively, with a first generated document plan being included within a parent document plan, representing the relationship between the template and sub-template used to generate the document plans. Sub-templates may be selectively chosen by the document planner such that particular sub-templates are only selected for use if particular constraints are met, such as constraints based on the results of queries performed against a message store.

Some example implementations of document plan templates will now be described in further detail to illustrate how a document plan template may include instructions used by a document planner to generate a document plan.

TABLE 1

```
<?xml version="1.0"?>
<!-- Simple Document Example -->
<document xmlns:xsi="http://www.w3.org/2001/XMLSchema-instance"
    xsi:noNamespaceSchemaLocation="docplanner-schema.xsd">
    <template id="simpledocument" type="root">
        <section title="Simple Document Demo">
            <sentence>
                <text>This is a simple Document Plan Template.</text>
            </sentence>
        </section>
    </template>
</document>
```

The document plan template depicted in table 1 illustrates a simple document plan template incorporating a single section and sentence. Attributes of the document plan, such as an identifier for the schema used to compile the plan, an identifier for the template, section titles, and the like are presented within markup tags. A particular sentence is delimited by <sentence> tags, with the static text for the sentence being indicated between <text> tags. <section> and <sentence> tags may correspond to section nodes and sentence nodes as depicted, for example, in FIG. 4.

TABLE 2

```
<?xml version="1.0"?>
<document xmlns:xsi="http://www.w3.org/2001/XMLSchema-instance"
    xsi:noNamespaceSchemaLocation="docplanner-schema.xsd">
    <template id="happydocument" type="root">
        <section title="Happy Document">
            <sentence>
                <text>John is very happy.</text>
            </sentence>
        </section>
    </template>
<template id="saddocument" type="root">
        <section title="Sad Document">
            <sentence>
                <text>John is very unhappy.</text>
            </sentence>
        </section>
    </template>
</document>
```

Table 2 illustrates how a single markup file can include definitions for multiple templates. In the instant example, the single markup file includes definitions for two document plan templates, a "happydocument" template and a "saddocument" template. Each of these templates is associated with the "root" type tag, which indicates that each template defines the start of a document. In some embodiments, only a single root template may be selected at a time, and by default the document planner may select a first template in a given markup language file for creating a document plan. However, in some embodiments this default processing may be altered or modified to specify an alternative root template by using a particular parameter (e.g., a command line parameter) upon execution of the document planner with the particular markup file.

TABLE 3

```
<?xml version="1.0"?>
<document xmlns:xsi="http://www.w3.org/2001/XMLSchema-instance"
```

TABLE 3-continued

```
    xsi:noNamespaceSchemaLocation="docplanner-schema.xsd">
    <template id="randomcannedtexts" type="root">
        <section>
            <sentence>
                <random>
                    <text>John is very happy.</text>
                    <text>John is slightly happy.</text>
                    <text>John is slightly sad.</text>
                    <text>John is very sad.</text>
                </random>
            </sentence>
        </section>
    </template>
</document>
```

Table 3 illustrates a document plan template that allows for random selection of a particular set of text when processed by a document planner. The <random> tags are used along with a set of <text> tags to indicate a set of possible output text for a given sentence. Upon processing the <random> tag, the document planner may be programmed to randomly select one of the text options presented between the <random> tags.

TABLE 4

```
<?xml version="1.0"?>
<document xmlns:xsi="http://www.w3.org/2001/XMLSchema-instance"
    xsi:noNamespaceSchemaLocation="docplanner-schema.xsd">
    <template id="simpledocument" type="root">
        <section title="Simple message-single-query Demo">
            <sentence>
                <message-single-query>
                    <messagestore-class>MILK_FEED</messagestore-class>
                </message-single-query>
            </sentence>
        </section>
    </template>
</document>
```

Table 4 illustrates the process of querying a message store to obtain a message for use in an output document plan. The tag <message-single-query> is used to obtain a message of the type "MILK_FEED" from a given message store. As described above with respect to FIGS. 1-3, the message store may contain messages identified from one or more datastreams. In this manner, upon processing the message-single-query tag, the document planner may query the message store to obtain one or more messages of the type "MILK_FEED". In the present example, such a message might indicate that a certain volume of milk was fed to a certain patient in a neo-natal unit. In the event multiple messages of the particular type are present, the document planner may select a single message for use in the sentence node associated with the query. For example, the document planner may select a message based on a time value associated with the message (e.g., the first message received of the type, or the most recent), a priority (e.g., the message of the given type associated with the patient with the most critical medical condition), a message volume (e.g., a message of the given type associated with the patient with the most messages of that given type), or according to various other criteria.

TABLE 5

```
<sentence>
    <message-single-query>
        <messagestore-class>MILK_FEED</messagestore-class>
```

TABLE 5-continued

```
        <order-by>
            <order-by-property name="date_of_entry" order="descending" />
            <order-by-property name="volume" order="ascending" />
        </order-by>
    </message-single-query>
</sentence>
```

Table 5 illustrates the use of an ordering property for a message query. As described above with respect to table 4, a particular message query may return multiple messages of the given type. The use of ordering properties allows for selection of a particular message based on user-defined criteria. In the present example, the messages are to be ordered in descending order based on their entry date, and ascending order based on a volume parameter associated with the message. As such, the message output would output the first message returned by the query when the returned messages are ordered by the date of entry and volume parameters.

TABLE 6

```
<sentence>
    <message-single-query>
        <messagestore-class>MILK_FEED</messagestore-class>
        <order-by>
            <order-by-property name="date_of_entry" order="descending" />
            <include-if>
                <property name="volume" />
                <conditional type=">" />
                <value intValue="5" />
            </include-if>
        </order-by>
    </message-single-query>
</sentence>
```

Table 6 illustrates a conditional inclusion of a particular message. The <include-if> tag allows the template author to specify whether or not a message should be included in a document plan. In the present example, the message is to be included if the message "volume" value is greater than 5, and if this condition is met, the first message meeting this criteria based on an ordering criteria established within the template. In the present example, the conditional term ">" is used to indicate the "greater than" relationship between the volume term and the integer 5. Since some markup languages such as XML disallow the use of "<" and ">" operators outside of tag delimiting indicators, various other terms and operators may be employed, such as ">", "<", and the like. In the present example, if no MILK_FEED messages exist with a volume term that is greater than 5, then no message will be included for the particular sentence node.

TABLE 7

```
<sentence>
    <message-single-query>
        <messagestore-class>MILK_FEED</messagestore-class>
        <order-by>
            <order-by-property name="date_of_entry" order="descending" />
            <relational type="AND">
                <include-if>
                    <property name="volume" />
                    <conditional type=">" />
                    <value intValue="5" />
                </include-if>
                <include-if>
                    <property name="instrument_used" />
                    <conditional type="CONTAINS" />
```

TABLE 7-continued

```
            <value isA="NGT" />
        </include-if>
      </relational>
    </order-by>
  </message-single-query>
</sentence>
```

Table 7 illustrates how embodiments may support the use of multiple conditional statements when determining whether to include a given message. For example, the use of conditional operators such as AND, OR, XOR, and the like may also be supported. In table 7, a MILK_FEED message should be included if the volume is greater than 5, and if the property "instrument" contains the class type "NGT". The <relational type=> tag is used to indicate that an "AND" relationship exists between the conditions, such that both must be satisfied for the given message to be included.

TABLE 8

```
<section title="SPARQL Query demo">
  <sentence>
    <sparql>
      prefix d2t:
      <http://com.data2text.messagestore.messages.medical/>
      prefix xsd: <http://www.w3.org/2001/XMLSchema#>
      SELECT * WHERE {
        ?a d2t:INCUBATE .
      }
    </sparql>
  </sentence>
</section>
```

Table 8 illustrates an example that includes an embedded SPARQL Protocol and RDF Query Language (SPARQL) query. SPARQL queries may be used in embodiments where the message store is stored in an RDF format. The use of SPARQL queries may allow a document plan template author to write more complex and/or advanced queries than provided by predefined XML tags offered by the document planner schema. In this example, the SPARQL query is defined using <sparql> tags. Upon processing these tags, the document planner may execute the defined query against the message store, and use a message or messages resulting from the query for the particular sentence node in which the query is defined.

TABLE 9

```
<multi-sentence type="no-list">
  <message-multi-query>
    <messagestore-class>DRUG_ADMINISTRATION</messagestore-class>
    <order-by>
      <order-by-property name="date_of_entry" order="descending" />
      <relational type="AND">
        <include-if>
          <property name="drug_given" />
          <conditional type="CONTAINS" />
          <value isA="DRUG" />
        </include-if>
        <include-if>
          <property name="date_of_entty" />
          <conditional type=">=" />
          <value para-name="startTime" type="dateTime" />
        </include-if>
        <include-if>
          <property name="date_of_entry" />
          <conditional type="<=" />
          <value para-name="endTime" type="dateTime" />
        </include-if>
```

TABLE 9-continued

```
      </relational>
    </order-by>
  </message-multi-query>
</multi-sentence>
```

Table 9 illustrates the use of a multiple-message query in a multi-sentence node. Multi-sentence nodes may allow for the inclusion of multiple messages. Multiple-message queries may retrieve multiple messages that meet particular criteria from the message store for use in such a multi-sentence node. In the instant example, the multi-sentence node is defined such that multiple messages with the type "DRUG_ADMINISTRATION" are retrieved from the message store using a multiple-message query as indicated by the use of a <message-multi-query> tag. The parameters of the multiple-message query retrieve any "DRUG_ADMINISTRATION" messages that contain a "drug_given" value of a particular drug, and which have a message date between a start date and an end date. The multi-sentence node would then include all messages that meet these criteria in the document plan output by the document planner. These messages may be inserted into particular sentence nodes of the out document plan.

TABLE 10

```
<section>
  <insert-if>
    <condition>
      <messagestore-class>BLOOD_TRANSFUSION</messagestore-class>
      <conditional type="IS NOT EMPTY" transitive="false" />
    </condition>
    <sentence>
      <text>Your baby has had a blood transfusion.</text>
    </sentence>
  </insert-if>
  <insert-if>
    <condition>
      <messagestore-class> PLATELET_TRANSFUSION </messagestore-class>
      <conditional type="IS NOT EMPTY" transitive="false" />
    </condition>
    <sentence>
      <text>Your baby has had a platelet transfusion.</text>
    </sentence>
  </insert-if>
</section>
```

Table 10 illustrates the use of a conditional to determine whether to include a particular section in the output document plan. Such conditionals may be used to control the insertion of sentences, paragraphs, sections, and the like. An optional "transitive" attribute on the conditional node may determine whether all child nodes should be assessed for the condition or not. In some embodiments, default processing may only evaluate messages of a particularly mentioned class unless the term "transitive" is set to a value of "true". In this manner, the document plan template may specify particular conditions for including certain parts of the document.

TABLE 11

```
<?xml version="1.0"?>
<document xmlns:xsi="http://www.w3.org/2001/XMLSchema-instance"
  xsi:noNamespaceSchemaLocation="docplanner-schema.xsd">
  <template id="ParameterDemo" type="root">
    <insert-if>
      <condition>
```

TABLE 11-continued

```
            <variable para-name="startTime" type="dateTime" />
            <conditional type=">" />
            <value dateTimeValue="02-01-2004 08:00:00" />
         </condition>
         <sub-template name="multitemplate" />
      </insert-if>
   </template>
   <template id="multitemplate" type="sub">
      <section>
         <sentence>
            <text>This is a canned text sentence.</text>
         </sentence>
      </section>
   </template>
</document>
```

Table 11 illustrates the use of a global parameter. Global parameters may be used to assist authors with propagating particular conditions across the entire template, or for various other programmatic reasons. In the present example, the <variable para-name=> tag is used to determine whether to insert a sub-template based on the value of a global variable "startTime". This global variable may be set or created independently of the document planner or document plan template. For example, it may be set by a module that executes prior to the document planning process. In the present example, if the value of the startTime parameter is greater than (e.g., based on the use of the ">" expression) the time 02-01-2004 08:00:00, then the content contained in the sub-template "multitemplate" is inserted into the document tree structure.

TABLE 12

```
<?xml version="1.0"?>
<document xmlns:xsi="http://www.w3.org/2001/XMLSchema-instance"
   xsi:noNamespaceSchemaLocation="docplanner-schema.xsd">
   <template id="rhetoricalrealtions-example" type="root">
      <section>
         <sentence id="ivfeedsen">
            <message-single-query>
               <messagestore-class>IV_FEED</messagestore-class>
            </message-single-query>
         </sentence>
         <sentence id="milkfeedsen">
            <message-single-query>
               <messagestore-class>MILK_FEED</messagestore-class>
            </message-single-query>
         </sentence>
         <rst nucleus="ivfeedsen" satellite="milkfeedsen"
type="CONTRAST" />
      </section>
   </template>
</document>
```

Table 12 illustrates the use of rhetorical relationships between sentence nodes. In the above example, the <rst> flag is used to indicate a rhetorical relationship between the "ivfeedsen" sentence and the "milkfeedsen" sentence, with a relationship type of "contrast". As such, when realized, an example sentence structure might be displayed as "John had an IV Feed of 5.4 mls/hr. However, he also had a Milk Feed of 1.0 mls/hr as well." Such a message highlights the contrast between the IV Feed sentence and the Milk Feed sentence through the use of the contrasting term "However". It should be appreciated that such an example could be extended based on the use of conditional terms, such as only using the contrast if the values associated with the messages diverge by at least a threshold value, or the like. The terms "nucleus" and "satellite" may be used to determine the order and priority of each message in the rhetorical relationship.

TABLE 13

```
<?xml version="1.0"?>
<document xmlns:xsi="http://www.w3.org/2001/XMLSchema-instance"
   xsi:noNamespaceSchemaLocation="docplanner-schema.xsd">
   <template id="multi-all-rhetoricalrealtions-example" type="root">
      <section>
         <multi-sentence type="no-list">
            <message-multi-query>
               <messagestore-class>MILK_FEED</messagestore-class>
               <order-by>
                  <order-by-property order="ascending" name="volume"/>
               </order-by>
            </message-multi-query>
            <multi-all-rst type="SEQUENCE"/>
         </multi-sentence>
      </section>
   </template>
</document>
```

Table 13 illustrates the use of a multiple rhetorical relationship tag among sentences of a particular multi-sentence node. In the instant example, the relationship between multiple MILK_FEED messages is defined as a sequence, such that the messages that match the multiple-message query are output and/or described in a sequence relationship with one another. In such an example, the first sentence node in the query may be the nucleus node and other sentences nodes may be satellite nodes.

TABLE 14

```
<section>
   <multi-sentence id="milkfeedsen" type="no-list" num="5">
      <message-multi-query>
         <messagestore-class>MILK_FEED</messagestore-class>
         <order-by>
            <order-by-property order="ascending" name="volume"/>
         </order-by>
      </message-multi-query>
   </multi-sentence>
   <rst nucleus="milkfeedsen" satellite="milkfeedsen"
      type="CONTRAST" nucleus-index="0" satellite-index="3" />
</section>
```

Table 14 illustrates how a rhetorical relationship tag may be used to define a one-to-one relationship in or between multi-sentence queries and also to add limits to the maximum number of messages returned by a multiple-sentence query using the "num" parameter. In Table 14, a rhetorical relationship is determined between the first and fourth items in a message array (indices 0 and 3, respectively) returned by a multiple-message query.

TABLE 15

```
<section>
   <multi-sentence id="milkfeedsen" type="no-list" num="5">
      <message-multi-query>
         <messagestore-class>MILK_FEED</messagestore-class>
         <order-by>
            <order-by-property order="ascending" name="volume"/>
         </order-by>
      </message-multi-query>
   </multi-sentence>
   <rst nucleus="milkfeedsen" satellite="milkfeedsen"
      type="SEQUENCE" nucleus-index="0" satellite-index="3" />
   <rst nucleus="milkfeedsen" satellite="milkfeedsen"
      type="SEQUENCE" nucleus-index="0" satellite-index="2" />
   <rst nucleus="milkfeedsen" satellite="milkfeedsen"
      type="CONTRAST" nucleus-index="1" satellite-index="4" />
</section>
```

Table 15 illustrates how a rhetorical relationship tag may be used to define multiple one-to-one relationships for a rhetorical structure theory (RST) relationship. In the present example, RST sequence relationships are determined between the first and fourth and the first and third messages of an array of messages returned in response to a multiple message query, while a RST contrast relationship is determined between the second and fifth messages.

TABLE 16

```
<section>
  <multi-sentence id="ivfeedsen" type="no-list" num="3">
    <message-multi-query>
      <messagestore-class>IV_FEED</messagestore-class>
      <order-by>
        <order-by-property order="ascending" name="volume"/>
      </order-by>
    </message-multi-query>
  </multi-sentence>
  <multi-sentence id="milkfeedsen" type="no-list" num="5">
    <message-multi-query>
      <messagestore-class>MILK_FEED</messagestore-class>
      <order-by>
        <order-by-property order="ascending" name="volume"/>
      </order-by>
    </message-multi-query>
  </multi-sentence>
  <rst nucleus="ivfeedsen" satellite="milkfeedsen" type="CONTRAST"
    nucleus-index="2" satellite-index="0" />
</section>
```

Table 16 illustrates how a rhetorical relationship tag may be used to define a contrasting relationship between two multiple-sentence queries. In the present example, the third IV_FEED message in the multi-sentence node "ivfeedsen" is compared to the first MILK_FEED message in the multi-sentence node "milkfeedsen".

TABLE 17

```
<section>
  <multi-sentence id="ivfeedsen" type="no-list" num="3">
    <message-multi-query>
      <messagestore-class>IV_FEED</messagestore-class>
      <order-by>
        <order-by-property order="ascending" name="volume"/>
      </order-by>
    </message-multi-query>
  </multi-sentence>
  <sentence id="milkfeedsen">
    <message-single-query>
      <messagestore-class>MILK_FEED</messagestore-class>
      <order-by>
        <order-by-property order="ascending" name="volume"/>
      </order-by>
    </message-single-query>
  </sentence>
  <rst nucleus="ivfeedsen" satellite="milkfeedsen" type="CONTRAST"
    nucleus-index="2" />
</section>
```

Table 17 illustrates how rhetorical relationships may be defined between a multi-sentence query and a single sentence query. In the present example, no index is necessary for the "milkfeedsen" message node, since the node only uses a single message query rather than a multiple-message query. Thus, the relationship is implicitly defined between the third message of the "ivefeedsen" multiple-sentence node and the only message node of the "milkfeedsen" single sentence node.

Various types of rhetorical relationships may be used to indicate the relationships between sentence nodes. These rhetorical relationships may be parsed by the document planner during generation of the document plan, or utilized by a microplanner and/or realizer during later stages of the NLG pipeline to assist with generation of natural language that properly captures the relationships between messages. Example rhetorical relationships may include, but are not necessarily limited to the following, as described below in Table 18:

TABLE 18

| Rhetorical Relation Type | Default Connective Word | Rhetorical Relation Description |
| --- | --- | --- |
| SEQUENCE | | Satellite follows nucleus in a generic sense e.g. "The baby has a low heart rate. It has a high blood pressure" |
| AGGREGATED_SEQUENCE | and | Same as SEQUENCE but the satellite is aggregated using the connective "and" with the nucleus e.g. "The baby has a low heart rate and it has a high blood pressure" |
| AGGERATED_SEQUENCE_WITHOUT_CONNECTIVE | | Same as AGGREGATED_SEQUENCE, but aggregated without a specified connective word. |
| TEMPORAL_SEQUENCE | then | The satellite node occurs in time after then nucleus node e.g. "The nurse |

TABLE 18-continued

| Rhetorical Relation Type | Default Connective Word | Rhetorical Relation Description |
|---|---|---|
| | | changed the baby's nappy. Then the nurse washed the baby's face." |
| CAUSE | because | The satellite node is a cause of the nucleus (inverse of RESULT) e.g. "The baby's heart rate increased, because the baby has an infection." N.B. This should be used what RST calls non-volitional cause, i.e., one observed event causing another observed event. If the satellite event was intended to cause the nucleus event, use VOLITIONAL_CAUSE. |
| CONSEQUENCE | therefore | The satellite is a consequence of the nucleus (synonym of CAUSE) e.g. "The baby's heart rate increased, therefore the baby has an infection." |
| VOLITIONAL_CAUSE | because | The satellite is a result of the nucleus, and this is intentional e.g. "The nurse gave the baby dopamine, so her heart rate increased" |
| ELABORATION | | The satellite elaborates the nucleus e.g. "The baby has an infection. It may be strep" |
| EXPLANATION | because | The satellite is (part of) the explanation for the nucleus, which is an inference e.g. "The baby may be infected, because the baby has purulent secretions." |
| CONTRAST | but | The satellite is in contrast to the nucleus, but they are kept together as one sentence e.g. "The baby was born prematurely, but was healthy." |
| JUXTAPOSITION | however | The satellite is in contrast to the nucleus, but they are in separate sentences e.g. "The baby was born prematurely. However, it was healthy." |
| CUSTOM1 | | End user customisable RST type. |
| CUSTOM2 | | End user customisable RST type. |
| CUSTOM3 | | End user customisable RST type. |
| CUSTOM4 | | End user customisable RST type. |
| CUSTOM5 | | End user customisable RST type. |

It should be readily appreciated that embodiments of the present invention could be used in connection with any message store for use in a NLG system. For example, embodiments may provide for the use of a document plan template in conjunction with a NLG system for generating natural language alerts in response to detecting errors or maintenance conditions in machines or devices, such as oil and gas drilling equipment. Example embodiments of such an alert generation system are described in U.S. patent application Ser. No. 14/023,023, which is herein incorporated by reference in its entirety. Table 18 illustrates an example of such a document plan template for generation of document plans relating to such messages.

TABLE 19

```
<?xml version="1.0" ?>
<document>
xmlns:xsi=http://www.w3.org/2001/XMLSchema-instance
    xsi:noNamespaceSchemaLocation="docplanner-schema.xsd">
<template id="instructiveNarrativeDocPlan" type="root">
<section title="Instructive Narrative">
<paragraph>
  <!--OPERATOR_TREND-->
<sentence>
<message-single-query>
 <messagestore-class>OPERATOR_TREND</messagestore-class>
 <!-- Select the message (trend) associated with the alert time-->
<relational type="AND">
<include-if>
 <property name="startTime" />
 <conditional type="<=" />
 <value para-name="alertTime" type="dateTime" />
  </include-if>
<include-if>
 <property name="endTime" />
 <conditional type=">=" />
 <value para-name="alertTime" type="dateTime" />
  </include-if>
  </relational>
  </message-single-query>
  </sentence>
<sentence>
<message-single-query>
 <messagestore-class>OPERATOR_TREND</messagestore-class>
<order-by>
 <order-by-property name="startTime" order="descending" />
 <!--Select the latest message (trend) if not within the alert time-->
<relational type="OR">
<include-if>
 <property name="startTime" />
 <conditional type=">=" />
 <value para-name="alertTime" type="dateTime" />
  </include-if>
<include-if>
 <property name="endTime" />
 <conditional type="<=" />
 <value para-name="alertTime" type="dateTime" />
  </include-if>
  </relational>
  </order-by>
  </message-single-query>
  </sentence>
  <!--OPERATOR_OFF_TREND-->
<sentence>
<message-single-query>
 <messagestore-class>OPERATOR_OFF_TREND</messagestore-class>
 <!--Select the message (trend) associated with the alert time-->
<relational type="AND">
<include-if>
 <property name="startTime" />
 <conditional type="<=" />
 <value para-name="alertTime" type="dateTime" />
  </include-if>
<include-if>
 <property name="endTime" />
 <conditional type=">=" />
 <value para-name="alertTime" type="dateTime" />
  </include-if>
  </relational>
  </message-single-query>
  </sentence>
<sentence>
<message-single-query>
 <messagestore-class>OPERATOR_OFF_TREND</messagestore-class>
<order-by>
 <order-by-property name="startTime" order="descending" />
 <!--Select the latest message (trend) if not within the alert time-->
<relational type="OR">
<include-if>
 <property name="startTime" />
 <conditional type=">=" />
 <value para-name="alertTime" type="dateTime" />
  </include-if>
<include-if>
 <property name="endTime" />
```

TABLE 19-continued

```
  <conditional type="<=" />
  <value para-name="alertTime" type="dateTime" />
   </include-if>
   </relational>
   </order-by>
   </message-single-query>
   </sentence>
   <!--POST_LUBE_DC_CYCLES-->
<sentence>
<message-single-query>
  <messagestore-class>POST_LUBE_DC_CYCLES</messagestore-class>
<order-by>
  <order-by-property name="estimatedCircleStartTime" order="descending" />
   </order-by>
   </message-single-query>
   </sentence>
   <!--TIME_SINCE_SHUTDOWN-->
<sentence>
<message-single-query>
  <messagestore-class>TIME_SINCE_SHUTDOWN</messagestore-class>
   <!--Select the message associated with the alert time-->
<relational type="AND">
<include-if>
 <property name="startTime" />
 <conditional type="<=" />
 <value para-name="alertTime" type="dateTime" />
   </include-if>
<include-if>
 <property name="endTime" />
 <conditional type=">=" />
 <value para-name="alertTime" type="dateTime" />
   </include-if>
   </relational>
   </message-single-query>
   </sentence>
<sentence>
<message-single-query>
  <messagestore-class>TIME_SINCE_SHUTDOWN</messagestore-class>
  <!--
  Select the message associated with the alert time
  -->
<order-by>
 <order-by-property name="startTime" order="descending" />
   <!--Select the latest message (trend) if not within the alert time-->
<relational type="OR">
<include-if>
 <property name="startTime" />
 <conditional type=">=" />
 <value para-name="alertTime" type="dateTime" />
   </include-if>
<include-if>
 <property name="endTime" />
 <conditional type="<=" />
 <value para-name="alertTime" type="dateTime" />
   </include-if>
   </relational>
   </order-by>
   </message-single-query>
   </sentence>
   <!--TIME_SINCE_RESTART-->
<sentence>
<message-single-query>
  <messagestore-class>TIME_SINCE_RESTART</messagestore-class>
   <!--Select the message associated with the alert time-->
<relational type="AND">
<include-if>
 <property name="startTime" />
 <conditional type="<=" />
 <value para-name="alertTime" type="dateTime" />
   </include-if>
<include-if>
 <property name="endTime" />
 <conditional type=">=" />
 <value para-name="alertTime" type="dateTime" />
   </include-if>
   </relational>
   </message-single-query>
   </sentence>
<sentence>
<message-single-query>
```

TABLE 19-continued

```
  <messagestore-class>TIME_SINCE_RESTART</messagestore-class>
  <!--Select the message associated with the alert time-->
<order-by>
 <order-by-property name="startTime" order="descending" />
 <!--Select the latest message (trend) if not within the alert time-->
<relational type="OR">
<include-if>
 <property name="startTime" />
 <conditional type=">=" />
 <value para-name="alertTime" type="dateTime" />
  </include-if>
<include-if>
 <property name="endTime" />
 <conditional type="<=" />
 <value para-name="alertTime" type="dateTime" />
  </include-if>
  </relational>
  </order-by>
  </message-single-query>
  </sentence>
  <!--SET_POINT_DESCRIPTION-->
<sentence>
<message-single-query>
 <messagestore-class>SETPOINT_DESCRIPTION</messagestore-class>
 <!--Select the message associated with the alert time-->
<relational type="AND">
<include-if>
 <property name="startTime" />
 <conditional type="<=" />
 <value para-name="alertTime" type="dateTime" />
  </include-if>
<include-if>
 <property name="endTime" />
 <conditional type=">=" />
 <value para-name="alertTime" type="dateTime" />
  </include-if>
  </relational>
  </message-single-query>
  </sentence>
<sentence>
<message-single-query>
 <messagestore-class>SETPOINT_DESCRIPTION</messagestore-class>
 <!--Select the message associated with the alert time-->
<order-by>
 <order-by-property name="startTime" order="descending" />
 <!--Select the latest message (trend) if not within the alert time-->
<relational type="OR">
<include-if>
 <property name="startTime" />
 <conditional type=">=" />
 <value para-name="alertTime" type="dateTime" />
  </include-if>
<include-if>
 <property name="endTime" />
 <conditional type="<=" />
 <value para-name="alertTime" type="dateTime" />
  </include-if>
  </relational>
  </order-by>
  </message-single-query>
  </sentence>
  </paragraph>
   <!--Operator Sensor Relation Paragraph
       <paragraph>
       <multi-sentence type="no-list">
     <message-multi-query max-results="3">
       <messagestore-
   class>CONFIRMATORY_SENSOR_RELATION</messagestore-class>
       <order-by>
        <order-by-property name="sensorId" order="descending" />
           </order-by>
         </message-multi-query>
         </multi-sentence>
         </paragraph>
  -->
<paragraph>
<sentence>
<message-single-query>
  <messagestore-class>EXPLANATORY_SENSOR_RELATION</messagestore-
  class>
```

TABLE 19-continued

```
  </message-single-query>
  </sentence>
  </paragraph>
<paragraph>
<multi-sentence>
<message-multi-query>
    <messagestore-class>CONFIRMATORY_SENSOR_RELATION</messagestore-
    class>
  </message-multi-query>
  </multi-sentence>
  </paragraph>
 - <!--Diagnosis Paragraph-->
<paragraph>
<sentence>
<message-single-query>
  <messagestore-class>POST_LUBE_DIAGNOSIS</messagestore-class>
  </message-single-query>
  </sentence>
  </paragraph>
  <!--Impact Paragraph-->
<paragraph>
<sentence>
<message-single-query>
  <messagestore-class>POST_LUBE_IMPACT</messagestore-class>
  </message-single-query>
  </sentence>
  </paragraph>
  <!--Alert History Paragraph-->
<paragraph>
<sentence>
<message-single-query>
  <messagestore-class>NARRATIVE_HISTORY</messagestore-class>
  </message-single-query>
  </sentence>
<sentence>
<message-single-query>
  <messagestore-class>MOST_RECENT_NARRATIVE</messagestore-class>
  </message-single-query>
  </sentence>
<sentence>
<message-single-query>
  <messagestore-class>NARRATIVE_ACTION_TAKEN</messagestore-class>
  </message-single-query>
  </sentence>
  </paragraph>
  </section>
  </template>
  </document>
```

As can be readily discerned from the example document plan template provided in Table 19, the template includes performing queries against a message store generated using sensor and machine data provided by monitoring machine equipment, such as oil and gas drilling equipment. The results of these queries are organized into a document plan according to the template. The document plan may be used as part of an NLG pipeline to provide natural language output corresponding to sensor data, maintenance notices, or other data pertaining to the monitored machine equipment in order to notify operators of the status of said equipment in a natural, efficient manner.

FIG. 5 illustrates a flow diagram of an example process for generating a document plan in accordance with embodiments of the present invention. As described above, a document plan template may be processed by a document planner to select, structure, and organize messages from a message store into a document plan. As described above, the output document plan may be in the form of a document tree that is populated by a plurality of messages and which may be used as part of a NLG pipeline. Example embodiments may allow for efficient and simplified authoring of document plan templates to assist with configuring the NLG pipeline to generate natural language for a particular type of document, domain, or the like. The process 500 may be performed by an apparatus, such as the NLG system 102 described with respect to FIG. 1 or the computer system 200 described with respect to FIG. 2, in accordance with some example embodiments of the present invention.

At action 502, the process receives a document plan template and a message store. As described above, the document plan template may be generated by a template generator, such as an application designed to author document plan templates. The message store may be generated by analysis of one or more datastreams. For example, the message store may include messages that relate to a particular datastream or datastreams, that are derived from analysis of the particular datastream or datastreams, and/or which represent inferences drawn from a particular datastream or datastreams. The message store may include various features of the included messages, including but not limited to unique identifiers for each message, type identifiers for each message, particular variables or data values associated with particular message types, and the like.

At action 504, the document plan template may be processed to identify one or more queries to be executed against the message store. For example, a document planner may identify particular message types and values to be retrieved from the message store based on message types and other conditions referenced in the document planner template. In some embodiments, the document plan template may further identify particular queries from the template, such as RDF queries defined within the template. For example, the document planner may identify the presence of particular tags, message types, and the like within the document planner template and map the tags to functions, libraries, queries, and the like to perform certain actions. As a particular example, where the document planner template defines a single message query based on a particular message type, the document planner may generate a query that, when executed, returns a message of the particular type from the datastore. In this manner, terms expressed in a markup language included in the document planner template may be mapped to executable code or queries to obtain requested information from the message store.

Identification of queries to be executed against the message store may be performed by identifying query nodes within the document plan template, such as nodes associated with a "message-single-query" or "message-multi-query" tag. In response to detecting one of these queries, the contents of the associated node may be sent to the message store for execution of the query.

At action 506, the queries identified at action 504 are executed against the message store to return a set of messages, message types, and values associated with the messages. As described above, these queries may return single messages, arrays of messages, an indication that no messages exist for that particular query, or the like. Execution of the queries identified at action 504 may include parsing the content of the node associated with the query tag and constructing a "MessageQuery" object based on the content. This node may include information defining the type of query, how the messages that are responsive to the query should be ordered, and what attributes the messages must contain to be a valid result of the query. Once the MessageQuery object is created, execution of the query may include identifying a message class name that matches the message type specified by the query. For example, if the class "MILK_FEED" was specified in the query, when the query is executed, it will first be determined for which message types "MILK_FEED" is a valid class name. It should be appreciated that more than one message type could be associated with a particular message class, though in many cases the class name and the message type may match.

After identifying the message class name associated with the query, messages of the identified message class name are determined. For example, if the class name is "MILK_FEED", then any messages that contain data relating the event associated with the MILK_FEED class (e.g., feeding milk to a baby in a neonatal unit) will be identified as responsive to the query. These messages may then be ordered based on a particular attribute of the message. For example, MILK_FEED messages might be ordered in ascending or descending order based on the volume of milk fed or the time the milk was fed. Messages may also be ordered according to multiple attributes.

Once the messages are ordered, the messages may be filtered using any "include-if" rules specified within the query. These rules may determine whether particular attributes of each message match the requirements of the query. The include-if rules may be inclusive or exclusive depending upon how the query is defined (e.g., by using "AND" or "OR" operators when specifying the rules). Messages that meet any include-if rules specified are returned as responsive to the query.

At action 508, the results of the queries executed at action 506 are used to continue processing of the document plan template. For example, as described above with respect to FIG. 4 and Tables 1-17, the presence or absence of particular messages may control various conditional formatting attributes of the document plan generated from the document plan template. Values of particular attributes within the messages present within the datastore or returned responsive to the queries may also control the conditional selection of parts (e.g., sub-templates, paragraph nodes, sentence nodes, or the like) of the document plan template. As part of processing the document plan template, various messages may be assigned to particular nodes defined within the document plan template to generate the document plan. If the query executed at action 506 was of a "message-single-query" type, then only the first message returned may be used to create the document plan, such as by inserting the message into a particular sentence node and inserted into a document plan tree. If the query was of a "message-multi-query" type, then all of the messages from the result set may be placed into a sentence node and inserted into a document plan tree.

At action 510, the document plan is generated as a result of the processing of the document plan template at actions 504-508. Generation of the document plan may include assigning messages to particular sentence nodes and inserting them into a document tree, where the document tree is defined in accordance with the document plan template and the results of processing the document plan template. For example, various conditional statements may exist within the document plan template, such that the conditional statements determine whether particular sentence, section, or paragraph nodes are present within the generated document plan tree. At the completion of the process 500, a complete document plan tree may have been generated including both the structure of the document (e.g., which nodes are present and how they depend from one another) and the content of the document (e.g., which messages are assigned to which node). This document plan may be used by other parts of an NLG pipeline to generate a natural language document.

It will be understood that each block of the flow chart, and combinations of blocks in the flow chart, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 201 of an apparatus employing an embodiment of the present invention and executed by a processor 203 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flow chart's block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flow chart's block(s).

The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow chart's block(s). As such, the operations of FIG. 5, when executed, convert a computer or processing circuitry into a particular machine configured to perform an example embodiment of the present invention. Accordingly, the operations of FIG. 5 define an algorithm for configuring a computer or processor, to perform an example embodiment. In some cases, a general purpose computer may be provided with an instance of the processor which performs the algorithm of FIG. 5 to transform the general purpose computer into a particular machine configured to perform an example embodiment.

Accordingly, blocks of the flow chart support combinations of means for performing the specified functions and combinations of operations for performing the specified functions. It will also be understood that one or more blocks of the flow chart, and combinations of blocks in the flow chart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for generating a document plan for use in a natural language generation process, the method comprising:
   detecting one or more of a particular event, pattern, or inference from raw input data, wherein the raw input data is expressed in a non-linguistic format;
   retrieving a document plan template and a message store, wherein the document plan template comprises program code defining the structure and content of a document plan, and wherein the document plan template is selected automatically for retrieval in response to and based at least in part on the detecting of the particular event, pattern, or inference from the raw input data, and wherein the detection of the particular event, pattern, or inference from the raw input data is associated with a domain type for which the document plan template provides a document plan;
   processing, by a processor, the document plan template to determine one or more messages from the message store for inclusion in the document plan; and
   generating the document plan, wherein a structure and a content of the document plan is determined at least based on the determined one or more messages and the document plan template.

2. The method of claim 1, wherein the program code is encoded in a markup language.

3. The method of claim 1, wherein at least one portion of the document plan is identified with a particular tag of the markup language.

4. The method of claim 1, wherein the program code indicates the presence of at least one message within a document plan tree structure, and wherein processing the document plan comprises:
   generating at least one query to retrieve the at least one message based on the program code; and
   executing the at least one query against the message store.

5. The method of claim 4, wherein the program code defines at least a message type of the at least one message, and wherein the query returns at least one message of the message type.

6. The method of claim 1, wherein the document plan comprises a document tree with a plurality of nodes, wherein one or more relationships among the nodes are defined by processing the document plan template, and wherein one or more messages from the message store are assigned to at least one of the plurality of nodes based on processing the document plan template.

7. The method of claim 1, wherein the document plan defines one or more rhetorical relationships among messages included in the document plan.

8. The method of claim 1, wherein the program code comprises at least one of a single message query executed by the processor against the message store, a multiple message query executed by the processor against the message store, or a conditional statement evaluated by the processor.

9. The method of claim 1, wherein the document plan template is associated with a particular domain model, and wherein the processing of the document plan template is based at least in part on the domain model.

10. The method of claim 1, further comprising:
    receiving a planner schema; and
    validating the document plan template using the planner schema.

11. The method of claim 1, further comprising generating a natural language document based on the document plan.

12. The method of claim 1, wherein the program code comprises at least one conditional statement that, based on an evaluation of the conditional statement during processing of the document plan, determines whether to include a particular sentence in the document plan.

13. The method of claim 12, wherein the condition of the conditional statement is the presence of a particular message with a particular message type is present within the message store.

14. An apparatus for generating a document plan for use in a natural language generation process, the apparatus comprising processing circuitry configured to implement a document planner by at least:

detecting one or more of a particular event, pattern, or inference from raw input data, wherein the raw input data is expressed in a non-linguistic format;

retrieving a document plan template and a message store, wherein the document plan template comprises program code defining the structure and content of a document plan, and wherein the document plan template is selected automatically for retrieval in response to and based at least in part on the detecting of the particular event, pattern, or inference from the raw input data, and wherein the detection of the particular event, pattern, or inference from the raw input data is associated with a domain type for which the document plan template provides a document plan;

processing the document plan template to determine one or more messages from the message store for inclusion in the document plan; and generating the document plan, wherein a structure and a content of the document plan are determined at least based on the determined one or more messages and the document plan template.

15. The apparatus of claim 14, wherein the program code indicates the presence of at least one message within a document plan tree structure, and the processing circuitry is configured to process the document plan by at least:

generating at least one query to retrieve the at least one message based on the program code; and executing the at least one query against the message store.

16. The apparatus of claim 15, wherein the program code defines at least a message type of the at least one message, and wherein the query returns at least one message of the message type.

17. The apparatus of claim 14, wherein the processing circuitry is further configured to implement the document planner by at least:

receiving a planner schema; and validating the document plan template using the planner schema.

18. The apparatus of claim 14, wherein the program code comprises at least one conditional statement that, based on an evaluation of the conditional statement during processing of the document plan, determines whether to include a particular sentence in the document plan.

19. The apparatus of claim 18, wherein the condition of the conditional statement is the presence of a particular message with a particular message type is present within the message store.

20. A non-transitory computer readable storage medium comprising program instructions for generating a document plan for use in a natural language generation process, the program instructions comprising:

program instructions for detecting one or more of a particular event, pattern, or inference from raw input data, wherein the raw input data is expressed in a non-linguistic format;

program instructions for retrieving a document plan template and a message store, wherein the document plan template comprises program code defining the structure and content of a document plan, and wherein the document plan template is selected automatically for retrieval in response to and based at least in part on the detecting of the particular event, pattern, or inference from the raw input data, and wherein the detection of the particular event, pattern, or inference from the raw input data is associated with a domain type for which the document plan template provides a document plan;

program instructions for processing the document plan template to determine one or more messages from the message store for inclusion in the document plan; and program instructions for generating the document plan, wherein a structure and a content of the document plan is determined at least based on the determined one or more messages and the document plan template.

* * * * *